United States Patent [19]

Kojima et al.

[11] 4,431,726
[45] Feb. 14, 1984

[54] SILVER HALIDE PHOTOGRAPHIC LIGHT-SENSITIVE ELEMENT CONTAINING A U.V. ABSORBING LAYER

[75] Inventors: Tetsuro Kojima; Tadashi Ikeda; Shingo Ishimaru; Naohiko Sugimoto, all of Kanagawa, Japan

[73] Assignee: Fuji Photo Film Co., Ltd., Kanagawa, Japan

[21] Appl. No.: 453,657

[22] Filed: Dec. 27, 1982

[30] Foreign Application Priority Data

Dec. 25, 1981 [JP] Japan .................................. 56-211283

[51] Int. Cl.³ .............................................. G03C 1/78
[52] U.S. Cl. .................................... 430/512; 252/589; 430/913; 526/268; 526/286; 526/298; 526/304; 526/328
[58] Field of Search ................ 430/512, 913; 252/589; 526/268, 298, 304, 286, 328

[56] References Cited

U.S. PATENT DOCUMENTS 4,340,664 7/1982 Monbaclu et al. ................... 430/512
4,359,522 11/1982 Postle ................................... 430/512

Primary Examiner—Jack P. Brammer
Attorney, Agent, or Firm—Sughrue, Mion, Zinn, Macpeak & Seas

[57] ABSTRACT

A silver halide photographic light-sensitive material is disclosed. The material is comprised of one or more light-sensitive silver emulsion layers and one or more light-insensitive layers. The silver halide layers or light-insensitive layers contain an ultraviolet ray absorbing polymer latex. The polymer latex is comprised of a homopolymer or copolymer having a repeating unit derived from monomers represented by the following general formula (I):

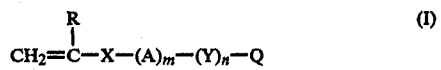

wherein the substituents within a general formula (I) are defined within the specification. The polymer latex (I) contains a substituents Q which represents an ultraviolet ray absorbing group represented by the general formula (II):

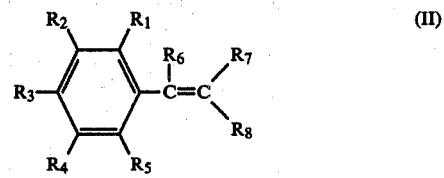

wherein $R_1$, $R_2$, $R_3$, $R_4$ and $R_5$ each represents a hydrogen atom, a halogen atom, an alkyl group having 1 to 20 carbon atoms, an aryl group having 6 to 20 carbon atoms, an alkoxy group having 1 to 20 carbon atoms, an aryloxy group having 6 to 20 carbon atoms, an alkylthio group having 1 to 20 carbon atoms, an arylthio group having 6 to 20 carbon atoms, an amino group, an alkylamino group having 1 to 20 carbon atoms, an arylamino group having 6 to 20 carbon atoms, a hydroxyl group, a cyano group, a nitro group, an acylamino group, a carbamoyl group, a sulfonyl group, a sulfamoyl group, a sulfonamide group, an acyloxy group or an oxycarbonyl group, and $R_1$ and $R_2$, $R_2$ and $R_3$, $R_3$ and $R_4$ or $R_4$ and $R_5$ may form a 5 to 6 member ring by ring closure; $R_6$ represents a hydrogen atom or an alkyl group having 1 to 20 carbon atoms; $R_7$ represents a cyano group, —COOR$_9$, —CONHR$_9$, —COR$_9$ or —SO$_2$R$_9$; and $R_8$ represents a cyano group, —COOR$_{10}$, —CONHR$_{10}$, —COR$_{10}$ or —SO$_2$R$_{10}$; wherein $R_9$ and $R_{10}$ each represents an alkyl group having 1 to 20 carbon atoms or an aryl group having 6 to 20 carbon atoms; wherein one of $R_1$, $R_2$, $R_3$, $R_4$, $R_5$, $R_6$, $R_7$ and $R_8$ bonds to the vinyl group through the linking group. The photographic material which includes the polymer latex of the invention has excellent absorption characteristics in the 300 to 400 nm range and does not cause static marks caused by ultraviolet rays. Furthermore, the material does not undergo deterioration of color reproduction and fading or discoloration of color images caused by light.

14 Claims, 9 Drawing Figures

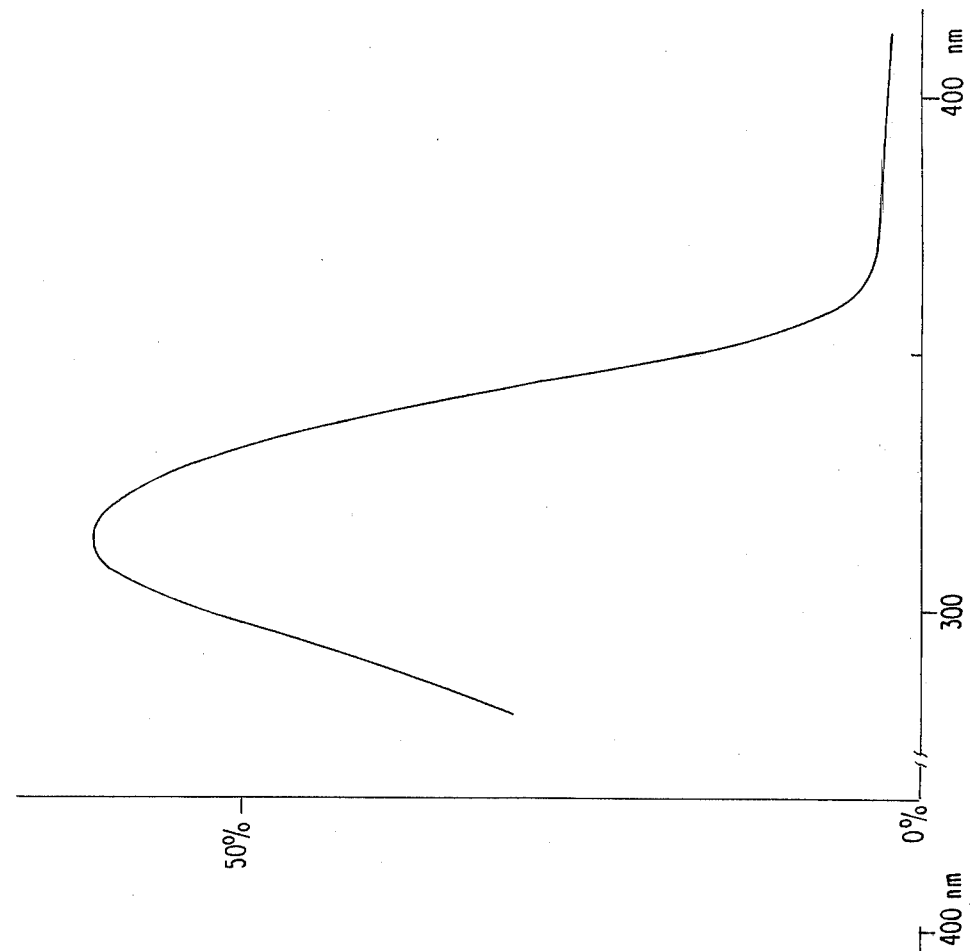
FIG. I(d)
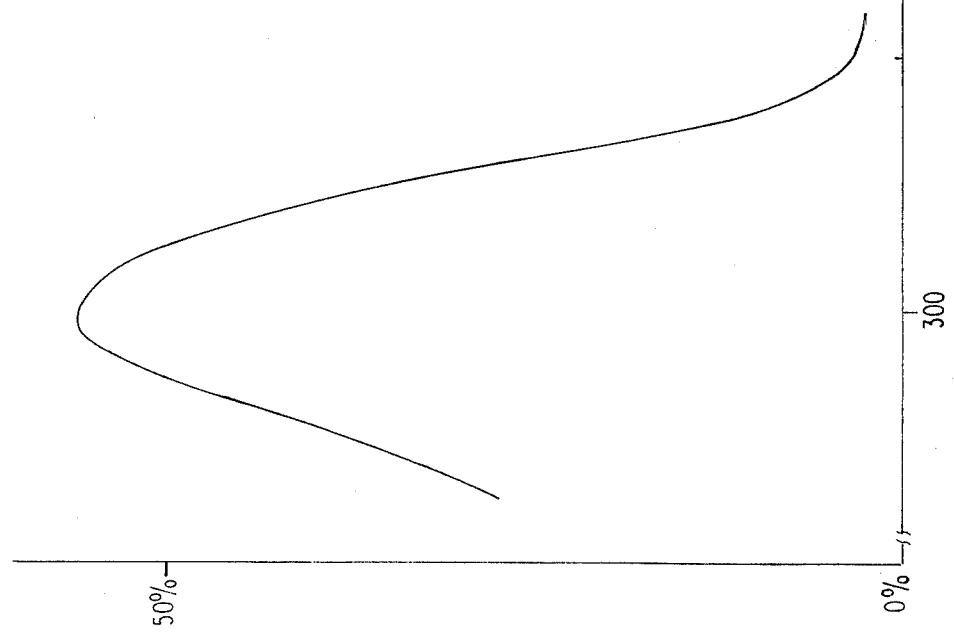
FIG. I(c)

SILVER HALIDE PHOTOGRAPHIC LIGHT-SENSITIVE ELEMENT CONTAINING A U.V. ABSORBING LAYER

FIELD OF THE INVENTION

The present invention relates to silver halide photographic light-sensitive materials and, particularly, to a process for preventing bad influences created by ultraviolet rays which comprises incorporating an ultraviolet ray absorbing polymer latex in a silver halide photographic light-sensitive material and to silver halide photographic light-sensitive materials wherein such an influence is prevented.

BACKGROUND OF THE INVENTION

It is well known that ultraviolet rays have a bad influence upon photographic light-sensitive materials. In the photographic light-sensitive materials, light-sensitive photographic emulsions containing silver halide as a chief component are applied to a base having a relatively high electrical insulating property such as a film composed of triacetyl cellulose, polyethylene terephthalate, polystyrene or polycarbonate, or a laminated paper covered with said film. Further, the surface of the photographic light-sensitive materials has a fairly high electrical insulating property. Therefore, when the surface of the photographic light-sensitive material comes in contact with the same or different kind of material during production or treatment of the photographic light-sensitive material, electric charges are generated by friction or separation. This phenomenon is called charging. When accumulation of static electricity by charging reaches a certain limiting value, atmospheric discharge occurs at a particular moment and a discharge spark flys at the same time. When the photographic light-sensitive material is exposed to light by discharging, branched, feathered, spotted or radial images appear after development. Images formed by such a phenomenon are called static marks in the photograhic field. It has been known that distribution of spectral energy of this kind of discharge luminecsence which causes static marks is in a range of 200 nm to 550 nm and particularly the intensity thereof is high in a range of 300 nm to 400 nm, and light energy in this range causes occurrence of static marks. Accordingly, attempts have been made to prevent the occurrence of static marks by shielding ultraviolet rays in a range of 300 and 400 nm by means of ultraviolet ray absorbing agents, as described in, for example, Japanese Patent Publication 10726/75 (corresponding to British Pat. No. 1,378,000 and German Patent No. 2,163,904), Japanese Patent Application (OPI) 26021/76 (corresponding to Belgian Pat. No. 832,793) and French Pat. No. 2,036,679, etc.

Further, excepting light-sensitive materials such as printing sensitive materials which are exposed to a specific light source or roentgen sensitive materials, etc., the conventional photographic light-sensitive materials are sometimes subject to an undesirable influence by ultraviolet rays included in light to be used for exposure. For example, in a black-and-white light-sensitive material, objects to be photographed which have a remarkably large quantity of spectral energy in an ultraviolet region, such as a snow scene, a seashore or the sky, etc. easily form soft tone images. In color light-sensitive materials, since it is desired to record only visible light, the influence of ultraviolet rays is very apparent. For example, when photographing the object which have a comparatively large quantity of spectral energy in the ultraviolet region, such as a distant view, a snow scene or an asphalted load, etc., the resulting color images are rich in cyan color. Further, color reproduction in color images is notably different according to light sources to be used for exposure, such as the sun, a tungsten lamp or a fluorescent lamp, etc. The cause of the difference is a difference of spectral energy in the ultraviolet region of light from these light sources. Namely, color images obtained by exposing to light emitted from a tungsten lamp become more reddish and those obtained by exposing to light emitted from a fluorescent lamp become more bluish than those obtained by exposing to sunlight. Accordingly, in order to obtain color photographic images which have correct color reproduction, it is desirable to prevent ultraviolet rays from reaching the silver halide light-sensitive layer of the color light-sensitive material when photographing. Examples of attempts at such have been described in, for example, Japanese Patent Applications (OPI) No. 56620/76 (corresponding to U.S. Pat. No. 4,045,229) and No. 49029/77 (corresponding to U.S. Pat. No. 4,200,464).

Furthermore, color photographs and, particularly, dye images formed on the light-sensitive emulsion layers by color development easily cause fading or discoloration of color images due to the action of ultraviolet rays. Couplers remaining in the emulsion layers after formation of color images are subject to the action of ultraviolet rays to form undesirable color stains on the finished photographs. This kind of action of ultraviolet rays on color photographs finished by photographic treatment is particularly remarkable with positive prints taken under sunlight containing a large quantity of ultraviolet rays. The fading and the discoloration of color images are easily caused by ultraviolet rays having wavelengths near the visible resion, namely, those having spectral energy in the area of 300 to 400 nm. Examples of useful ultraviolet ray absorbing agents which act in reducing bad influences caused by these types of ultraviolet rays are described in U.S. Pat. Nos. 3,215,530, 3,707,375, 3,705,805, 3,352,681, 3,278,448, 3,253,921, 3,738,837, Japanese Patent Publications 26138/74 and 25337/75, British Patent No. 1,338,265 and Japanese patent application (OPI) 56,620/76, etc.

Hitherto, a number of ultraviolet ray absorbing agents have been proposed for various uses such as the use described above. However, ultraviolet ray absorbing agents used hitherto for silver halide photographic light-sensitive materials are not sufficiently suitable for the above described uses, because they color and form stains due to insufficient stability to ultraviolet rays, heat and humidity. Further, they have inferior compatibility with binders, they diffuse into other layers causing bad influences due to substantial interlayer migration, or the emulsion may be unstable causing separation of crystals. Further, these ultraviolet ray absorbing agents have been frequently used in a surface protective layer of silver halide photographic light-sensitive materials, and when high boiling point organic solvents are used for emulsification, the high boiling point organic solvents soften the layer and substantially deteriorate interlayer adhesion or antiadhesive property. In order to prevent such problems, it is necessary to use a large amount of gelatine or to provide a gelatine protective layer on the layer. This results in thickening the layer containing the ultraviolet ray absorbing agent.

An example of a type of ultraviolet ray absorbing agent which does not have such disadvantages is a polymer ultraviolet ray absorbing agent. However, such agents are insufficient for solving these problems. As a result of earnest studies, the present inventors have found that these problems can be completely solved by using a polymer latex obtained by polymerization of certain kinds of ultraviolet ray absorbing monomers.

There is a process for adding polymer ultraviolet ray absorbing agents in a form of latex to a hydrophilic colloid composition. One such process comprises adding a latex prepared by emulsion polymerization directly to a hydrophilic colloid. Another process comprises dispersing an oleophilic polymer ultraviolet ray absorbing agent obtained by polymerization of ultraviolet ray absorbing monomers in an aqueous solution of gelatine in a form of latex. Such ultraviolet ray absorbing polymer latexes have been described in, for example, U.S. Pat. No. 3,761,272 and 3,745,010, Japanese patent application (OPI) No. 107835/78 and European Pat. No. 27242, etc.

The processes for adding the polymer ultraviolet ray absorbing agents in a form of latex to a hydrophilic colloid composition have many advantages as compared with other processes.

First (1) it is not necessary to use high boiling point organic solvents used hitherto, because hydrophobic materials are in the form of a latex, (2) strength of the film formed from the latex is not deteriorated, (3) it is possible to easily incorporate the ultraviolet ray absorbing agent in a high concentration in the hydrophilic colloid layer, because the latex can contain ultraviolet ray absorbing monomers in a high concentration, and (4) an increase of viscosity is small. Further, (5) other layers are not affected because of complete nonmigration, and (6) separation of the ultraviolet ray absorbing agents in the hydrophilic colloid layer is small and the hydrophilic colloid layer is capable of thinning. Particularly, when the ultraviolet ray absorbing polymer latex is produced by emulsion polymerization a specific method for dispersing is not required and the step of adding the ultraviolet ray absorbing agent to the coating solution can be simplified. However, though the ultraviolet ray absorbing polymer latexes known hitherto have some of the fundamental above described excellent advantages, they have the following problems. Therefore, they can not be practically used if such problems can not be improved.

1. Since the absorption peak of the ultraviolet ray absorbing agent becomes broad, stains are formed or sensitivity of the silver halide emulsion is unnecessary reduced.

2. The absorption characteristic in the 300 to 400 nm range is poor, and the effect of preventing static marks and color reproduction are inferior.

3. Since the ultraviolet ray absorbing agent itself is not sufficiently stable to ultraviolet rays, heat and humidity, it colors and causes stains.

4. Ultraviolet ray absorbing monomers are not suitable for mass production, because they have very low solubility and poor polymerization ability, 3. It is necessary to add a large amount in order to obtain a desired density, because the ultraviolet ray absorbing monomers have a low absorbance.

SUMMARY OF THE INVENTION

A primary object of the present invention is to provide silver halide photographic light-sensitive materials containing a novel ultraviolet ray absorbing polymer latex having an excellent absorption characteristic in the 300 to 400 nm range which does not cause static marks caused by ultraviolet rays, deterioration of color reproduction, and fading or discoloration of color images caused by light.

Another object of the present invention is to provide silver halide photographic light-sensitive materials containing a novel ultraviolet ray absorbing polymer latex which does not have a bad influence by diffusion into other layers due to very small interlayer migration. The fact that diffusion does not occur during development processing is an important matter not only for preventing pollution of treating baths but also for color printing papers and light-sensitive materials for a diffusion transfer process.

Yet another object of the present invention is to provide silver halide photographic light-sensitive materials containing a novel ultraviolet ray absorbing polymer latex which is sufficiently stable to ultraviolet rays, heat and humidity.

Still another object of the present invention is to provide silver halide photographic light-sensitive materials containing a novel ultraviolet ray absorbing polymer latex having high film strength which does not influence properties of the film such as adhesion.

Another object of the present inventisn is to provide silver halide photographic light-sensitive materials containing a novel ultraviolet ray absorbing polymer latex, wherein the membrane is thin and the resulting images have improved sharpness.

Another object of the present invention is to provide silver halide photographic light-sensitive materials containing a novel ultraviolet ray absorbing polymer latex which does not have a bad influence upon photographic properties such as sensitivity or fog.

As a result of earnest studies, the present inventors have found that these objects of the present invention are attained by using an ultraviolet ray absorbing polymer latex composed of a polymer or a copolymer having a repeating unit derived from monomers represented by the following general formula (I). Namely, it has be found that they can be attained by silver halide photographic light-sensitive materials comprising at least one light-sensitive silver halide emulsion layer and at least one light-insensitive layer provided on a base, which are characterized by containing an ultraviolet ray absorbing polymer latex composed of a homopolymer or a copolymer having a repeating unit derived from monomers represented by the following general formula (I). General formula (I)

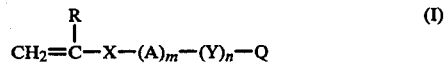

wherein R represents a hydrogen atom, a lower alkyl group having 1 to 4 carbon atoms (for example, a methyl group, an ethyl group, a n-propyl group, an isopropyl group or n-butyl group, etc.) or a chlorine atom; X represents —CONH—, —COO— or a phenylene group; A represents a linking group selected from alkylene groups having 1 to 20 carbon atoms (for example, methylene group, ethylene group, trimethylene group, 2-hydroxytrimethylene group, pentamethylene group, hexamethylene group, ethylethylene group, propylene group and decamethylene group, etc.) and arylene groups having 6 to 20 carbon atoms, (for example, phenylene groups, etc.); Y represents —COO—, —OCO—, —CONH—, —NHCO—, —SO$_2$NH—, —NHSO$_2$—, —SO$_2$— or —O—, and m and n each represents 0 or an integer of 1.

Q represents an ultraviolet ray absorbing group represented by the following general formula (II). General formula (II)

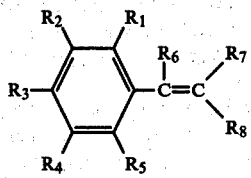

wherein R$_1$, R$_2$, R$_3$, R$_4$ and R$_5$ each represents a hydrogen atom, a halogen atom (for example, a chlorine atom or a bromine atom), an alkyl group having 1 to 20 carbon atoms (for example, a methyl group, an ethyl group, a n-propyl group, an isopropyl group, a n-butyl group, a t-butyl group, a n-amyl group, a t-amyl group, a n-octyl group, a t-octyl group, a methoxyethyl group, an ethoxypropyl group, a hydroxyethyl group, a chloropropyl group, a benzyl group or a cyanoethyl group, etc.), an aryl group having 6 to 20 carbon atoms (for example, a phenyl group, a tolyl group, a mesityl group, a chlorophenyl group, etc.), an alkoxy group having 1 to 20 carbon atoms (for example, a methoxy group, an ethoxy group, a propoxy group, a butoxy group, an octyloxy group, a 2-ethylhexyloxy group, a methoxymethoxy group, a methoxyethoxy group or an ethoxyethoxy group, etc.), an aryloxy group having 6 to 20 carbon atoms (for example, a phenoxy group or a 4-methylphenoxy group, etc.), an alkylthio group having 1 to 20 carbon atoms (for example, a methylthio group, an ethylthio group, a propylthio group or a n-octylthio group, etc.), an arylthio group having 6 to 20 carbon atoms (for example, a phenylthio group, etc.), an amino group, an alkylamino group having 1 to 20 carbon atoms (for example, a methylamino group, an ethylamino group, a benzylamino group, a dimethylamino group or a diethylamino group, etc.), an arylamino group having 6 to 20 carbon atoms (for example, an anilino group, a diphenyl amino group, an anisidino group or a toluidino group, etc.), a hydroxy group, a cyano group, a nitro group, an acylamino group (for example, an acetylamino group, etc.), a carbamoyl group (for example, a methylcarbamoyl group or a dimethylcarbamoyl group, etc.), a sulfonyl group (for example, a methylsulfonyl group or a phenylsulfonyl group, etc.), a sulfamoyl group (for example, an ethylsulfamoyl group or a dimethylsulfamoyl group, etc.), a sulfonamide group (for example, a methanesulfonamide group, etc.), an acyloxy group (for example, an acetoxy group or a benzoyloxy group, etc.) or an oxycarbonyl group (for example, a methoxycarbonyl group, an ethoxycarbonyl group or a phenoxycarbonyl group, etc.), and R$_1$ and R$_2$, R$_2$ and R$_3$, R$_3$ and R$_4$ or R$_4$ and R$_5$ may form a 5- or 6 member ring by ring closure (for example, a methylenedioxy group, etc.). R$_6$ represents a hydrogen atom, or an alkyl group having 1 to 20 carbon atoms (for example, a methyl group, an ethyl group, a n-propyl group, an isopropyl group, a n-butyl group, a n-amyl group or a n-octyl group, etc.), R$_7$ represents a cyano group, —COOR$_9$, —CONHR$_9$, —COR$_9$ or —SO$_2$R$_9$, and R$_8$ represents a cyano group, —COOR$_{10}$, —CONHR$_{10}$, —COR$_{10}$ or —SO$_2$R$_{10}$, wherein R$_9$ and R$_{10}$ each represents the same alkyl group or aryl group as described above.

Further, at least one of R$_1$, R$_2$, R$_3$, R$_4$, R$_5$, R$_6$, R$_7$ and R$_8$ bonds to the vinyl group through the above described linking group.

DETAILED DESCRIPTION OF THE INVENTION

Figure 1B:
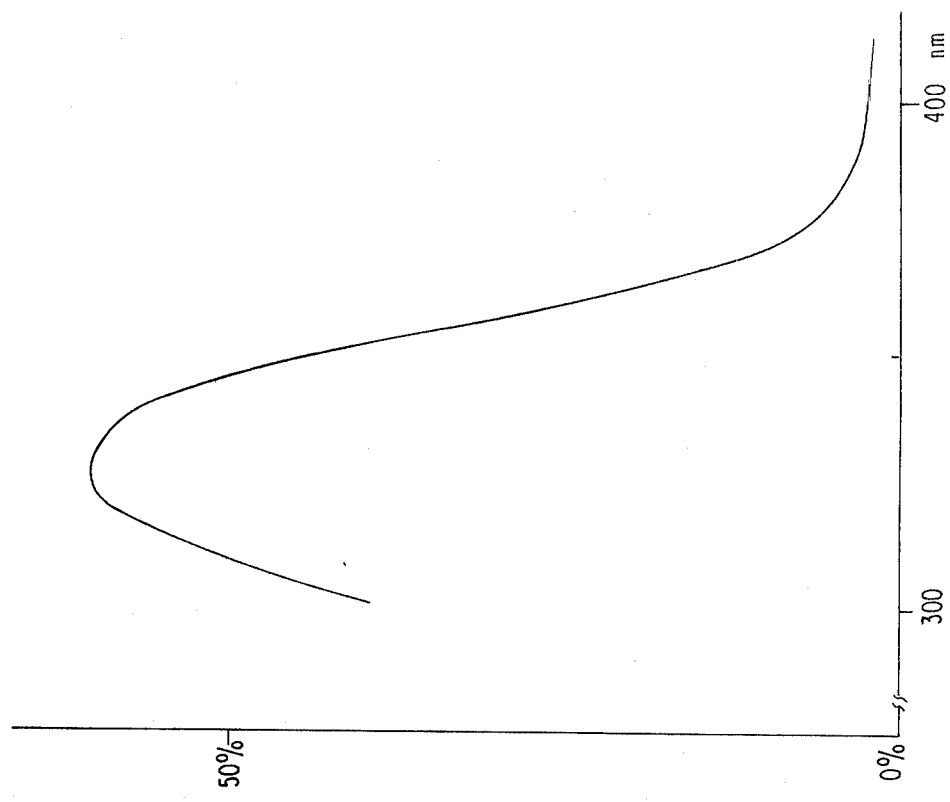
FIGS. 1 (a), (b), (c), (d) and (e) and FIGS. (a), (b), (c) and (d) each indicates a spectral absorption curve, wherein the abscissa means absorption wavelength (unit: nm) and the ordinate means absorbance (%).

In compounds represented by the above described general formula (I), it is preferred that R represents a hydrogen atom, a lower alkyl group having 1 to 4 carbon atoms or a chlorine atom, X represents —CONH—, —COO— or a phenylene group, A represents a linking group represented by an alkylene group having 1 to 20 carbon atoms or an arylene group having 6 to 20 carbon atoms, Y represents —COO—, —OCO—, —CONH—, —NHCO— or —O—, and m and n each represents 0 or an integer of 1. Q represents an ultraviolet ray absorbing group represented by the formula (II). In the formula (II), R$_1$, R$_2$, R$_3$, R$_4$ and R$_5$ each represents a hydrogen atom, a halogen atom, an alkyl group having 1 to 20 carbon atoms, an aryl group having 6 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, a hydroxy group, an acylamino group, a carbamoyl group, an acyloxy group or an oxycarbonyl group, and R$_1$ and R$_2$, R$_2$ and R$_3$, R$_3$ and R$_4$ or R$_4$ and R$_5$ may form a ring. R$_6$ represents a hydrogen atom, or an alkyl group having 1 to 20 carbon atom, R$_7$ represents a cyano group, —COOR$_9$—, —CONHR$_9$—, —COR$_9$ or —SO$_2$R$_9$, and R$_8$ represents a cyano group, —COOR$_{10}$, —CONHR$_{10}$, —COR$_{10}$ or —SO$_2$R$_{10}$, wherein R$_9$ and R$_{10}$ each represents an alkyl group having 1 to 20 carbon atoms or an aryl group having 6 to 20 carbon atoms. Further, at least one of R$_1$, R$_2$, R$_3$, R$_4$, R$_5$, R$_6$, R$_7$ and R$_8$ bonds to the vinyl group through the above described linking group.

In compounds represented by the above described general formula (I), it is particularly preferred that R represents a hydrogen atom, a lower alkyl group having 1 to 4 carbon atoms or a chlorine atom, X represents —COO—, and m and n represent 0. Q represents an ultraviolet ray absorbing group represented by the general formula (II). In the general formula (II), R$_1$, R$_2$, R$_4$ and R$_5$ each represents a hydrogen atom, R$_3$ represents a hydrogen atom or an alkyl group having 1 to 5 carbon atoms, R$_6$ represents a hydrogen atom, R$_7$ represents a cyano group, and R$_8$ represents —COOR$_{10}$ wherein R$_{10}$ represents an alkylene group having 1 to 20 carbon atoms which bonds to the vinyl group.

Examples of monomers (comonomers) used for copolymerizing with the ultraviolet ray absorbing monomers, include ethylenically unsaturated monomers such as acrylic acids, α-chloroacrylic acids, α-alacrylic acids (for example, esters and, preferably, lower alkyl esters and amides derived from acrylic acids such as methacrylic acid, etc., for example, acrylamide, methacrylamide, t-butylacrylamide, methyl acrylate, methyl methacrylate, ethyl acrylate, ethyl methacrylate, n-propyl acrylate, n-butyl acrylate, 2-ethylhexyl acrylate, n-hexyl acrylate, octyl methacrylate, lauryl methacrylate and methylenebisacrylamide, etc.), vinyl esters (for example, vinyl acetate, vinyl propionate and vinyl laurate, etc.), acrylonitrile, methacrylonitrile, aromatic vinyl compounds (for example, styrene and derivatives thereof such as vinyl toluene, divinylbenzene, vinylacetophenone, sulfostyrene and styrenesulfinic acid, etc.), itaconic acid, citraconic acid, crotonic acid, vinylidene chloride, vinyl alkyl ethers (for example, vinyl ethyl ether, etc.), maleic acid esters, N-vinyl-2-pyrrolidone, N-vinylpyridine and 2- and 4-vinylpyridine, etc.

Among them, acrylic acid esters, methacrylic acid esters and aromatic vinyl compounds are particularly preferred to use.

Two or more of the above described comonomer compounds may be used together. For example, it is possible to use n-butyl acrylate and divinylbenzene, styrene and methyl methacrylate, or methyl acrylate and methacrylic acid.

Ethylenically unsaturated monomers for copolymerizing with ultraviolet ray absorbing monomers corresponding to the above described general formula (I) can be selected so as to have a good influence upon physical properties and/or chemical properties of the produced copolymer, for example, solubility, compatibility with binders such as gelatine in the photographic colloid compositions or other photographic additives, for example, known photographic ultraviolet ray absorbing agents, known photographic antioxidants and known color image forming agents, plasticity and thermal stability thereof, etc.

For example, in case of hardening a latex itself in order to harden the hydrophilic colloid layer, it is preferred to use comonomers having a high glass transition point (Tg) (for example, styrene or methyl methacrylate).

The ultraviolet ray absorbing polymer latex used in the present invention may be produced by an emulsion polymerization process as described above or may be produced by adding a solution prepared by dissolving an oleophilic polymer obtained by polymerization of ultraviolet ray absorbing monomer in an organic solvent (for example, ethyl acetate) to an aqueous solution of gelatine together with a surface active agent and stirring to disperse in a form of latex.

These processes can be applied to formation of homopolymers and formation of copolymers. In the latter case, it is preferred that comonomers are liquid, because they function as a solvent for ultraviolet ray absorbing monomers which are solid in a normal state when carrying out emulsion polymerization. Free radical polymerization of ethylenically unsaturated solid monomers is started by addition of a free radical formed by thermal decomposition of a chemical initiator, a function of a reducing agent in an oxidizing compound (redox initiator) or a physical function such as ultraviolet rays or other high energy radiation or high frequency, etc.

Examples of principal chemical initiators include persulfates (for example, ammonium persulfate or potassium persulfate, etc.), hydrogen peroxide, peroxides (for example, benzoyl peroxide or chlorobenzoyl peroxide, etc.) and azonitrile compounds (for example, 4,4'-azobis-(4-cyanovaleric acid) and azobisisobutyronitrile, etc.), etc.

Examples of conventional redox initiator include hydrogen-ion (II) salt, potassium persulfate-potassium bisulfate and cerium salt-alcohol, etc.

Examples of the initiators and the action thereof have been described in F. A. Bovey, Emulsion Polymerization isused by Interscience Publishes Inc. New York, 1955, pages 59–93.

As emulsifiers used when carrying out emulsion polymerization, compounds having interfacial activity are used, and preferable examples of them include sulfonates and sulfates, cationic compounds, amphoteric compounds and high molecular protective colloids. Examples of them and the action thereof have been described in Belgische Chemissche Industrie, vol. 28, pages 16–20 (1963).

On the other hand, when dispersing the oleophilic polymer ultraviolet ray absorbing agent in an aqueous solution of gelatine in a form of latex, the organic solvent used for dissolving the oleophilic polymer ultraviolet ray absorbing agent is removed prior to application of the dispersion or by volatilization during drying of the dispersion coated (though not suitable).

As the solvents, there are those which have a certain degree of water solubility so as to be capable of being removed by a water wash in a gelatine noodle state and those which can be removed by spray drying, vacuum or steam purging.

Further, examples of organic solvents capable of being removed include esters (for example, lower alkyl esters), lower alkyl ethers, ketones, halogenated hydrocarbons (for example, methylene chloride or trichloroethylene, etc.), fluorinated hydrocarbons, alcohols (for example, n-butyl alcohol to octyl alcohol) and combinations of them.

As dispersing agents for dispersing the oleophilic polymer ultraviolet ray absorbing agents, any type of abstance may be used, but ionic surface active agents and particularly anionic surface active agents are suitable.

Further, it is possible to use ampholytic agents such as C-cetylbetaine, N-alkylaminopropionic acid salts or N-alkyliminodipropionic acid salts.

In order to increase dispersion stability and to improve the flexibility of emulsions coated, a small amount (less than 50% by weight of the ultraviolet ray absorbing polymer) of permanent solvents, namely, water immiscible organic solvents having a high boiling point (higher than 200° C.) may be added. It is necessary for the concentration of the permanent solvents to be sufficiently low in order to plasticize the polymer while it is kept in a state of a solid particle. Furthermore, when using the permanent solvents, it is preferred that the amount thereof is as small as possible so as to thin the thickness of the final emulsion layer or the hydrophilic colloid layer in order to maintain high sharpness.

It is preferred that the amount of the ultraviolet ray absorbing agent part (monomer represented by the general formula (I)) in the ultraviolet ray absorbing polymer latex of the present invention is generally 5 to 100% by weight, but an amount of 50 to 100% by weight is particularly preferred from the viewpoint of the thickness of the layer and stability.

In the following, typical examples of ultraviolet ray absorbing monomers corresponding to the general formula (I) of the present invention are described, but the compounds in the present invention are not limited to them.

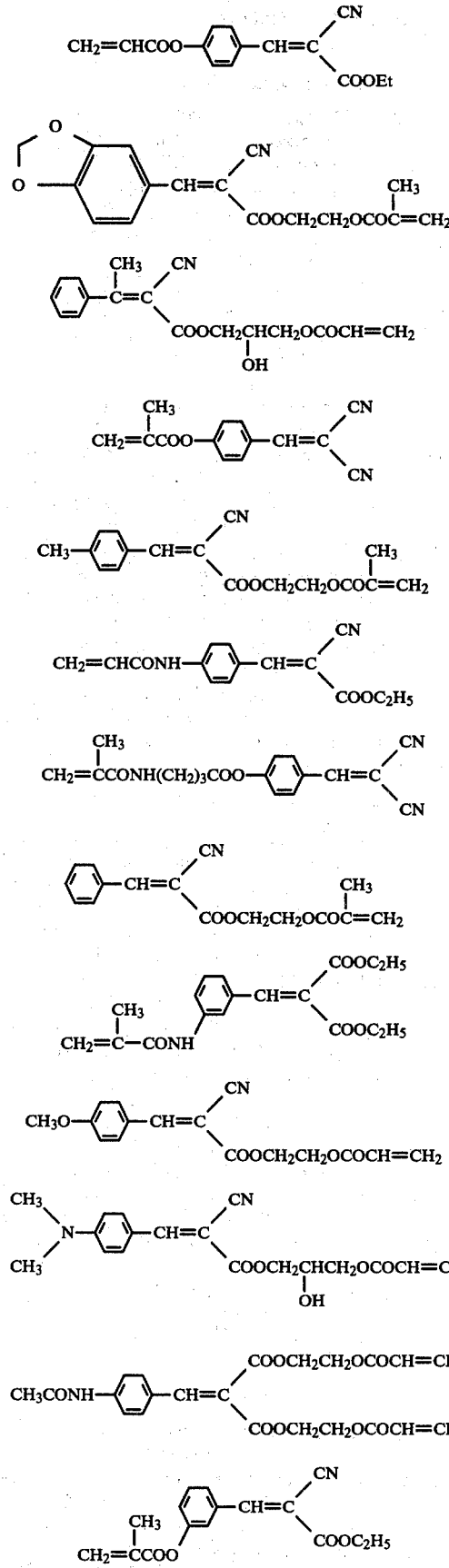
-continued
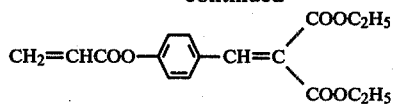
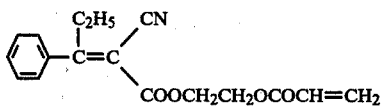
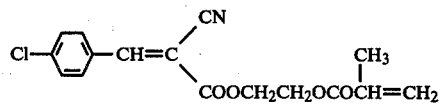
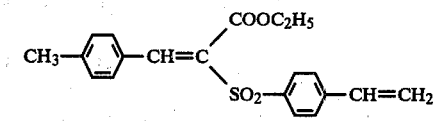
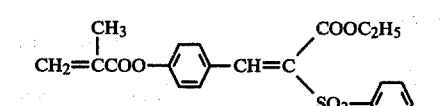
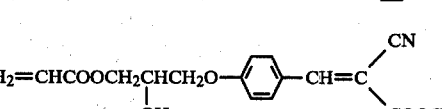
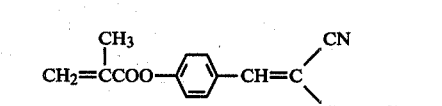
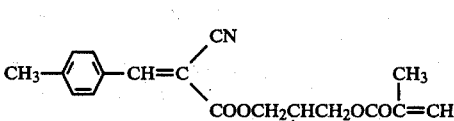
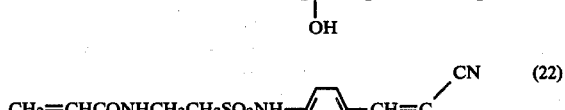
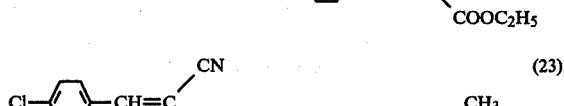
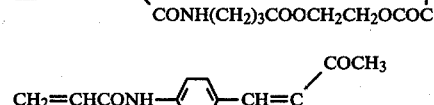
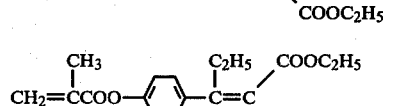
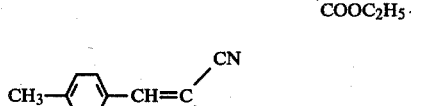
Examples of preferred compositions of the homopolymer or copolymer ultraviolet ray absorbing agents used in the present invention are described.

P-1 to P-26: Homopolymers of the above Compounds (1) to (26)
P-27: Copolymer of Compound (5): methyl methacrylate=7:3 (ratio by weight)
P-28: Copolymer of Compound (5): methyl methacrylate=5:5
P-29: Copolymer of Compound (5): methyl acrylate=7:3
P-30: Copolymer of Compound (8): styrene=5:5
P-31: Copolymer of Compound (8): butyl acrylate=7.5:2.5
P-32: Copolymer of Compound (1): methyl methacrylate=7:3
P-33: Copolymer of Compound (1): methyl methacrylate=5:5
P-34: Copolymer of Compound (8): methyl acrylate=7:3
P-35: Copolymer of Compound (2): methyl methacrylate=5:5
P-36: Copolymer of Compound (16): methyl methacrylate=7:3
P-37: Copolymer of Compound (16): methyl acrylate=5:5

The ultraviolet ray absorbing monomers corresponding to the general formula (I) can be synthesized by reacting a compound synthesized by the process described in U.S. Pat. No. 4,200,464 or Beilsteins Handbuch der Organischen Chemie (4th eddition) vol. 10, page 521 (1942), etc. with acid halide of acrylic acid or α-substituted acrylic acid such as acryloyl chloride or methacrloyl chloride, and can be synthesized by a reaction of 2-cyano-3-phenylacrylic acid with hydroxyethyl acrylate, hydroxyethyl methacrylate or glycidyl acrylate, etc. as described in Japanese Patent Application (OPI) No. 11102/73 (corresponding to U.S. Pat. No. 3,804,628).

Typical examples of synthesizing the compounds used in the present invention are described in the following.

(A) Monomer compound

Synthesis 1 (Compound (5))

Tolualdehyde (400 g), cyanoacetic acid (311 g), acetic acid (60 ml) and ammonium acetate (25.6 g) were refluxed in ethyl alcohol (1.6 l) for 4 hours with heating. After the reaction, the mixture was concentrated to 600 ml by removing ethyl alcohol under a reduced pressure, followed by pouring into 1 liter of ice-cold water to separate crystals. The separated crystals were filtered out by suction and recrystallized from 2 liters of ethyl alcohol to obtain 2-cyano-3-(4-methylphenyl)acrylic acid which melted at 210°–215° C. in a yield of 560 g. The resulting compound (320 g) and thionyl chloride (252 g) were dissolved in acetonitrile (200 ml) with heating for 1 hour. After the reaction, acetonitrile and thionyl chloride were distilled off under a reduced pressure, and the resulting solid was added to a solution consisting of hydroxyethyl methacrylate (244.8 g), pyridine (149 g) and acetonitrile (2 l). The reaction was carried out for 2 hours while keeping the reaction temperature below 40° C. After the reaction, the reacting solution was poured into ice-cold water to separate crystals, and the resulting crystals were recrystallized from ethyl alcohol (3 l) to obtain 360 g of the desired product which melted at 74°–75° C.

The resulting product was confirmed by the results of IR, NMR and elementary analysis.

Elementary analysis value ($C_{17}H_{17}NO_4$)
Theoretical value H: 5.72% C: 68.22% N: 4.68%
Found value H: 5.75% C: 68.16% N: 4.76%
$\lambda_{max}CH_3OH = 311$ nm Synthesis 2 (Compound (8))

Benzaldehyde (200 g), cyanoacetic acid (176 g), acetic acid (30 ml) and ammonium acetate (14.5 g) were refluxed for 4 hours in ethyl alcohol (800 ml) with heating. After the reaction, the mixture was concentrated to 400 ml by removing ethyl alcohol under a reduced pressure, followed by pouring into 1 liter of ice-cold water to separate crystals. The resulting crystals were recrystallized from 250 ml of acetonitrile to obtain 2-cyano-3-phenylacrylic acid which melted at 184°–188° C. in a yield of 265 g. The resulting compound (150 g) and thionyl chloride (176 g) were dissolved in acetonitrile (100 ml) with heating for 1 hour. After the reaction, acetonitrile and thionyl chloride were distilled off under a reduced pressure, and the resulting solid was added to a solution consisting of hydroxyethyl methacrylate (124 g), pyridine (75 g) and acetonitrile (1 l). The reaction was carried out for 2 hours while keeping the reaction temperature below 40° C. After the reaction, the reacting solution was poured into ice-cold water to separate crystals, and the resulting crystals were recrystallized form ethyl alcohol (1 l) to obtain 205 g of the desired product which melting at 68°–70° C.

The resulting product was confirmed by the results of IR, NMR and elementary analysis.

Elementary analysis value ($C_{16}H_{14}NO_4$)
Theoretical value H: 4.96% C: 67.60% N: 4.93%
Found value H: 4.87% C: 67.65% N: 4.99%
$\lambda_{max}CH_3OH = 298$ nm Synthesis 3 (Compound (1))

4-hydroxybenzaldehyde (30 g), ethyl cyanoacetate (31.7 g), acetic acid (4.5 ml) and ammonium acetate (1.9 g) were refluxed in ethyl alcohol (100 ml) for 4 hours with heating. After the reaction, the reacting solution was poured into 500 ml of ice-cold water to separate crystals. The resulting crystals were recrystallized from methyl alcohol (400 ml) to obtain 65 g of ethyl-2-cyano-3-(4-hydroxyphenyl)acrylate which melted at 89°–91° C. The resulting compound (10.9 g) and pyridine (4.3 g) were dissolved in tetrahydrofuran (100 ml), and acryloyl chloride (4.5 g) was added dropwise thereto. The reaction was carried out for 2 hours while keeping the reaction temperature below 40° C. After the reaction, the reacting solution was poured into ice-cold water to separate crystals, and the resulting crystals were recrystallized from methyl alcohol (100 ml) to obtain 11 g of the desired product which melted at 82°–85° C. The resulting compound was confirmed by the results of IR, NMR and elementary analysis.

Elementary analysis value ($C_{15}H_{13}NO_4$)
Theoretical value H: 4.83% C: 66.41% N: 5.16%
Found value H: 4.91% C: 66.42% N: 5.08%
$\lambda_{max}CH_3OH = 323$ nm Synthesis 4 (Compound (21))

2-cyano-3-(4-methylphenyl)acrylic acid (9.4 g) obtained by the process described in Synthesis 1, glycidyl methacrylate (7.1 g) and triethylamine (2.5 g) were refluxed for 5 hours in methyl ethyl ketone (120 ml) with heating. After the reaction, methyl ethyl ketone was distilled off under a reduced pressure, and the residue was subjected to column chromatography (Kieselgel 60, produced by Merk Co.) to collect ethyl acetate/hexane effluent. When recrystallization was carried out from methyl alcohol 7 g of the desired product which melted at 52°–53° C. was obtained. The resulting product was confirmed by the results of IR, NMR and elementary analysis.

Elementary analysis value ($C_{18}H_{19}NO_5$)
Theoretical value H: 5.81% C: 65.64% N: 4.25%
Found value H: 5.90% C: 65.52% N 4.30%
$\lambda_{max}CH_3OH = 311$ nm (B) Polymer compound Synthesis 5 Homopolymer latex of Compound (5)

600 ml of an aqueous solution containing 10 g of a sodium salt of oleylmethyltauride was heated to 90° C. by passing a nitrogen stream slowly therethrough under stirring. To the resulting mixture, 20 ml of an aqueous solution containing 350 mg of potassium persulfate was added. Then, a solution prepared by dissolving 50 g of ultraviolet ray absorbing monomer (5) in 200 ml of ethanol by heating was added thereto. After addition, the mixture was stirred for 1 hour while heating to 85°–90° C., and 10 ml of an aqueous solution containing 150 mg of potassium persulfate was added thereto. After the reaction was carried out for further 1 hour, ethanol was distilled off as an azeotropic mixture with water. The produced latex was cooled. After the pH was adjusted to 6.0 by 1 N sodium hydroxide, the latex was filtered. The concentration of the polymer in the latex was 7.81%. Further, the latex had an absorption maximum in 330 nm in the aqueous system.

Synthesis 6. Copolymer latex of Compound (8) and n-butyl acrylate 800 ml of an aqueous solution containing 15 g of sodium salt of oleylmethyltauride was heated to 90° C. by slowly passed a nitrogen stream therethrough under stirring. To the resulting mixture, 20 ml of an aqueous solution containing 525 mg of potassium persulfate was added.

Then, 50 g of the ultraviolet ray absorbing monomer (8) and 25 g of n-butyl acrylate were dissolved in 200 ml of ethanol with heating, and the resulting solution was added to the above mixture. After addition, the mixture was stirred for 1 hour with heating to 85°–90° C., and 10 ml of an aqueous solution containing 225 mg of potassium persulfate was added thereto. After the reaction was carried out for an additional 1 hour, ethanol and unreacting n-butyl acrylate were distilled off as an azeotropic mixture with water. The produced latex was cooled. After the pH was adjusted to 6.0 by 1 N sodium hydroxide, the latex was filtered. The concentration of the copolymer in the latex was 10.23%. The nitrogen analysis value indicated that the produced copolymer contained 65.8% of the ultraviolet ray absorbing monomer unit. Further, the latex had an absorption maximum in 316 nm in the aqueous system.

Synthesis 7 Copolymer latex of Compound (5) and methyl methacrylate 4 l of an aqueous solution containing 75 g of sodium salt of oleylmethyltauride was heated to 90° C. while slowly passing a nitrogen stream therethrough under stirring. To the resulting mixture, 50 ml of an aqueous solution containing 2.6 g of potassium persulfate was added.

Then, 300 g of the ultraviolet ray absorbing monomer (5) and 60 g of methyl methacrylate were dissolved in 1 l of ethanol, and the resulting solution was added to the above mixture. After addition, the mixture was stirred for 1 hour while heating to 85°–90° C., and 20 ml of an aqueous solution containing 1.1 g of potassium persulfate was added thereto. After the reaction was carried out for an additional 1 hour, ethanol and unreacting methyl methacrylate was distilled off as an azeotropic mixture with water. The produced latex was cooled. After the pH was adjusted to 6.0 by 1 N sodium hydroxide, the latex was filtered. The concentration of the copolymer in the latex was 9.42%. The nitrogen analysis value indicated that the produced copolymer contained 78.9% of the ultraviolet ray absorbing monomer unit. Further, the latex had an absorption maximum in 327 nm in the aqueous system.

Synthesis 8 Copolymer latex of Compound (1) and methyl methacrylate 1 l of an aqueous solution containing 15 g of sodium salt of oleylmethyltauride was heated to 90° C. while slowly passing a nitrogen stream therethrough under stirring. To the resulting mixture, 20 ml of an aqueous solution containing 225 mg of potassium persulfate was added. Then, 10 g of methyl methacrylate was added thereto, and the mixture was stirred for 1 hour while heating to 85°–90° C. to synthesize a latex (a). Then, to the resulting latex (a), a solution prepared by dissolving 50 g of the ultraviolet ray absorbing monomer (1) and 10 g of methyl methacrylate in 200 ml of ethanol was added and thereafter 20 ml of an aqueous solution containing 300 mg of potassium persulfate was added. After the reaction was carried out for 1 hour, 20 ml of an aqueous solution containing 225 mg of potassium sulfate was added. After subsequently carrying out the reaction for 1 hour, ethanol and unreacting methyl methacrylate were distilled off as an azeotropic mixture with water. The produced latex was cooled. After the pH was adjusted to 6.0 by 1 N sodium hydroxide, the latex was filtered. The concentration of the copolymer in the latex was 8.38%. The nitrogen analysis value indicated that the produced copolymer contained 62.3% of the ultraviolet ray absorbing monomer unit.

Synthesis 9

Synthesis 1 of oleophilic polymer ultraviolet ray absorbing agent:

21 g of the ultraviolet ray absorbing monomer (8) and 9 g of methyl acrylate were dissolved in 150 ml of dioxane. While stirring the resulting solution at 70° C. under a nitrogen stream, a solution prepared by dissolving 270 mg of 2,2'-azobis-(2,4-dimethylvaleronitrile) in 5 ml of dioxane was added, and the reaction was carried out for 5 hours. Then, the resulting product was poured into 2 l of iso-cold water, and the separated solid was filtered out, followed by sufficient washing with water. The product was dried to obtain 25.3 g of the oleophilic polymer ultraviolet ray absorbing agent. As a result of nitrogen analysis of the oleophilic polymer ultraviolet ray absorbing agent, it was indicated that the produced copolymer contained 64.5% of the ultraviolet ray absorbing monomer unit.

$\lambda_{max}CH_3COOC_2H_5 = 300$ nm

Process for producing an ultraviolet ray absorbing polymer latex (A)

First, two solutions (a) and (b) were prepared as follows.

(a) 70 g of a 10 weight % aqueous solution of bone gelatine (pH: 5.6 at 35° C.) was heated to 32° C. to dissolve.

(b) 5 g of the above described oleophilic polymer was dissolved in 20 g of ethyl acetate at 38° C., and a 70 weight % solution of sodium dodecylbenzenesulfonate in methanol was added thereto.

Then the solutions (a) and (b) were put in an explosion protective mixer. After stirring for 1 minute at a high rate, operation of the mixer was stopped and ethyl acetate was distilled off under a reduced pressure. Thus, polymer latex (A) wherein the oleophilic polymer ultraviolet ray absorbing agent was dispersed in a diluted aqueous solution of gelatine was produced.

Synthesis 10

Synthesis 2 of oleophilic polymer ultraviolet ray absorbing agent:

63 g of the ultraviolet ray absorbing monomer (5) and 27 g of methyl methacrylate were dissolved in 450 ml of dioxane. While stirring the resulting solution at 70° C. under a nitrogen stream, a solution prepared by dissolving 810 mg of 2,2'-azobis-(2,4-dimethylvaleronitrile) in 15 ml of dioxane was added, and the reaction was carried out for 5 hours. Then, the resulting product was poured into 5 l of ice-cold water, and the separated solid was filtered out, followed by sufficient washing with water and methanol. The product was dried to obtain 78 g of an oleophilic polymer ultraviolet ray absorbing agent. As a result of nitrogen analysis of the oleophilic polymer ultraviolet ray absorbing agent, it was indicated that the produced copolymer contained 66.3% of the ultraviolet ray absorbing monomer unit.
$\lambda_{max}CH_3COOC_2H_5 = 315$ nm Process for producing an ultraviolet ray absorbing polymer latex (B):

A polymer latex (B) was produced by the same procedure as that for the above described polymer latex (A).

The ultraviolet ray absorbing polymer latex of the present invention is used by adding it to the hydrophilic colloid layers of silver halide photographic light-sensitive materials, such as a surface protective layer, an intermediate layer or a silver halide emulsion layer, etc. It is preferred to use it in the surface protective layer or the hydrophilic colloid layer adjacent to the surface protective layer. Particularly, it is preferable to add it to the lower layer in the surface protective layer consisting of two layers.

The amount used of the ultraviolet ray absorbing polymer latex in the present invention is not restricted, but it is preferred to be in a range of 10 to 2000 mg and preferably, 50 to 1000 mg per square meter.

Examples of silver halide photographic light-sensitive materials which can make use of the present invention include color negative films, color reversal filsm, color papers and color diffusion transfer light-sensitive materials, etc.

In the following, components other than the ultraviolet ray absorbing polymer latex in the silver halide photographic light-sensitive materials of the present invention and processes for development, etc. are described briefly.

As protective colloids for the hydrophilic colloid layers of the present invention, gelatine is advantageously used, but other hydrophilic colloids may be used.

For example, it is possible to use proteins such as gelatine derivatives, graft polymers of gelatine with other high polymers, albumin or casein, etc.; saccharose derivatives such as cellulose derivatives such as hydroxyethyl cellulose, carboxymethyl cellulose or cellulose sulfate, etc., sodium alginate or starch derivatives, etc.; and various synthetic hydrophilic high molecular substances such as homo polymers or copolymers, for example, polyvinyl alcohol, polyvinyl alcohol partial acetal, poly-N-vinylpyrrolidone, polyacrylic acid, polymethacrylic acid, polyacrylamide, polyvinylimidazole or polyvinylpyrazole, etc.

Useful gelatines, include lime-treated gelatine as well as acid-treated gelatine and enzyme treated gelatine as described in Bull. Soc. Sci. Phot. Japan, No. 16, page 30 (1966). Further, hydrolyzed products and enzymatic decomposition products of gelatine can be used.

Examples of useful silver halides for the silver halide emulsion layers of the present invention include silver bromide, silver iodobromide, silver iodochlorobromide, silver chlorobromide and silver chloride.

The silver halide emulsions used in the present invention can be prepared by processes described in P. Glafkides, Chimie et Physique Photographique (issued by Paul Montel Co., 1967), G. F. Duffin, Photographic Emulsion Chemistry, (issued by The Focal Press, 1966) and V. L. Zelikman et al, Making and Coating Photographic Emulsion (issued by The Focal Press, 1966), etc. Namely, any of an acid process, a neutral process and an ammonia process may be used. Further, as a type of reacting soluble silver salts with soluble halogen salts, it is possible to use any of a one-side mixing process, a simultaneous mixing process and combination thereof.

A process for forming silver halide particles in an excess amount of silver ions (the so-called reversal mixing process) can be used, too. As a type of the simultaneous mixing process, it is possible to use a process wherein a liquid phase for forming silver halide is kept at a constant pAg, namely, the so-called controlled double jet process.

According to this process, silver halide emulsions having a regular crystal form and a nearly uniform particle size are obtained.

Cadmium salts, zinc salts, lead salts, thallium salts, iridium salts or complex salts thereof, rhodium salts or complex salts thereof, and iron salts or complex salts thereof may be coexistent in the step of forming silver halide particles or the step of physical ageing.

The silver halide emulsions of the present invention can be chemically sensitized by conventional methods.

Namely, it is possible to use a sulfur sensitization process using sulfur containing compounds capable of reacting with active gelatine or silver (for example, thiosulfates, thioureas, mercapto compounds and rhodanines), a reduction sensitization process using reducing substances (for example, stannous salts, amines, hydrazine derivatives, formamidine sulfinic acid and silane compounds) and a noble metal sensitization process using noble metal compounds (for example, gold complex salts and complex salts of metals belonging to Group VIII in the periodic table, such as Pt, Ir or Pd, etc.), which may be used alone or as a combination.

In order to prevent fogging in the step of producing the light-sensitive materials, during preservation or during photographic treatment or to stabilize photographic properties, various compounds can be incorporated in the silver halide emulsions of the present invention. Namely, it is possible to add various compounds known as antifogging agents or stabilizers, such as azoles, for example, benzothiazolium salts, nitroindazoles, triazoles, benzotriazoles and benzimidazoles (particularly, nitro- or halogen substituted derivatives); heterocyclic mercapto compounds, for example, mercaptothiazoles, mercaptobenzothiazoles, mercaptobenzimidazoles, mercaptothiadiazoles, mercaptotetrazoles (particularly, 1-phenyl-5-mercaptotetrazole) and mercaptopyrimidines; the above described heterocyclic mercapto compounds which have water soluble groups such as a carboxyl group or a sulfo group, etc.; thioketo compounds, for example, oxazolinethione; azaindenes, for example, tetraazaindenes (particularly, 4-hydroxy substituted-(1,3,3a,7)tetrazaindenes); benzenethiosulfonic acids; and benzenesulfinic acid; etc.

The hydrophilic colloid layers in the light-sensitive materials of the present invention may contain various surface active agents for various purposes such as coating assistants, prevention of electrically charging, improvement of slipping property, emulsifying and dispersing, prevention of adhesion and improvement of photographic properties (for example, acceleration of development, hard tone, and sensitization), etc.

For example, it is possible to use nonionic surface active agents such as saponin (steroid type), alkylene oxides (for example, polyethylene glycol, polyethylene glycol/polypropylene glycol condensation products, polyethylene glycol alkyl ethers, polyethylene glycol alkylaryl ethers, polyethylene glycol esters, polyethylene glycol sorbitan esters, polyalkylene glycol alkylamines or amides, and polyethylene oxide addition products of silicone), glycidol derivatives (for example, alkenylsuccinic acid polyglycerides and alkylphenol polyglycerides), aliphatic acid esters of polyhydric alcohols, or alkyl esters of saccharose, etc.; anionic surface active agents having acid groups such as a carboxyl group, a sulfo group, a phospho group, a sulfuric acid ester group or a phosphoric acid ester group, etc., such as alkylcarboxylic acid salts, alkylsulfonic acid salts, alkylbenzenesulfonic acid salts, alkylnaphthalenesulfonic acid salts, alkylsulfuric acid esters, alkylphosphoric acid esters, N-acyl-N-alkyltaurines, sulfosuccinic acid esters, sulfoalkyl polyoxyethylene alkyl phenyl eters or polyoxyethylene alkylphosphoric acid esters, etc.; ampholytic surface active agents such as amino acids, aminoalkylsulfonic acids, aminoalkylsulfuric or phosphoric acid esters, alkylbetaines or amineoxides, etc.; and cationic surface active agents such as alkylamine salts, aliphatic or aromatic quaternary ammonium salts, heterocyclic quaternary ammonium salts such as pyridinium salts or imidazolium salts, etc., or aliphatic or heterocyclic phosphonium or sulfonium salts, etc.

The silver halide emulsions of the present invention may be spectrally sensitized by methine dyes or others. These sensitizing dyes can be used alone, but combinations of them may be used. Combinations of sensitizing dyes are frequently used for the purpose of supersensitization. The emulsion may contain dyes which do not have a spectral sensitization function themselves or substances which do not substantially absorb visible light but have a function of supersensitization, together with the sensitizing dyes.

Useful sensitizing dyes, combinations of dyes having a function of supersensitization and substances having a function of supersensitization have been described in Research Disclosure, Vol. 176, 17643 (Dec. 1978) page 23, paragraph IV-J.

The hydrophilic colloid layers such as a silver halide emulsion layer or a surface protective layer in the present invention may contain inorganic or organic hardening agents. For example, it is possible to use chromium salts (chromium alum or chromium acetate, etc.), aldehydes (formaldehyde, glyoxal or glutaraldehyde, etc.), N-methylol compounds (dimethylolurea, or methyloldimethyl hydantoin, etc.), dioxane derivatives (2,3-dihydroxydioxane, etc.), active vinyl compounds (1,3,5-triacryloxy-hexahydro-s-triazine or 1,3-vinylsulfonyl-2-propanol, etc.), active halogen compounds (2,4-dichloro-6-hydroxy-s-triazine, etc.) and mucohalogenic acids (mucochloric acid or mucophenoxychloric acid, etc.), which may be used alone or as a combination.

The photographic light-sensitive materials of the present invention may contain color forming couplers, namely, compounds capable of coloring by oxidative coupling with an aromatic primary amine developing agent (for example, phenylenediamine derivatives or aminophenol derivatives, etc.) by color development. Examples of them include 5-pyrazolone couplers, pyrazolobenzimidazole couplers, cyanoacetylocoumarone couplers and ring-opened acylacetonitrile couplers, etc. as magenta couplers; acylacetamide couplers (for example, benzoylacetanilides and pivaloyl acetanilides), etc. as yellow couplers; and naphthol couplers and phenol couplers, etc. as cyan couplers. These couplers are preferred to have hydrophobic groups called ballast groups in the molecule so as to be nondiffusible. The couplers may be any of 4-equivalence and 2-equivalence to silver ion. Further, they may be colored couplers having an effect of color correction or couplers which release a development inhibitor by development (the so-called DIR couplers).

Further, noncoloring DIR coupling compounds which produce a colorless product by coupling reaction and release a developing inhibitor may be contained in addition to DIR couplers.

The light-sensitive materials of the present invention may contain hydroquinone derivatives, aminophenol derivatives, gallic acid derivatives and ascorbic acid derivatives, etc. as anti-color-fogging agents.

When practicing the present invention, the following known antifading agents can be used together. Further, color image stabilizers used in the present invention may be alone or a combination of two or more thereof. Examples of known antifading agents include hydroquinone derivatives, gallic acid derivatives, p-alkoxyphenols, p-oxyphenol derivatives and bisphenols.

The hydrophilic colloid layers of the photographic light-sensitive materials of the present invention can contain a water insoluble or nearly insoluble synthetic polymer dispersion for the purpose of improvement of dimensional stability. For example, it is possible to use polymers composed of one or more of alkyl acrylate (or methacrylate), alkoxyalkyl acrylate (or methacrylate), glycidyl acrylate (or methacrylate), acrylamide (or methacrylamide), vinyl ester (for example, vinyl acetate), acrylonitrile, olefine and styrene, etc. and polymers composed of a combination of the above described monomer components and acrylic acid, methacrylic acid, $\alpha,\beta$-unsaturated dicarboxylic acid, hydroxyalkyl acrylate (or methacrylate), sulfoalkyl acrylate (or methacrylate) or styrenesulfonic acid, etc.

The present invention is suitably applied to multilayer color photographic materials comprising at least two layers having each a different spectral sensitivity on a base. The multilayer color photographic materials generally have at least each a red-sensitive emulsion layer, a green-sensitive emulsion layer and a blue-sensitive emulsion layer on the base. The order of these layers can be suitably selected as occasion demands. Generally, the red-sensitive emulsion layer contains cyan forming couplers, the green-sensitive emulsion layer contains magenta forming couplers and the blue-sensitive emulsion layer contains yellow forming couplers, but other combinations may be adopted, if necessary.

Exposure to light for obtaining photographic images may be carried out by the conventional method. Namely, it is possible to use various known light sources such as natural light (sunlight), a tungsten light, a fluorescent light, a mercury lamp, a xenon arc lamp, a carbon arc lamp, a xenon flash light, or a cathode ray tube flying spot, etc. As exposure time, not only exposure for 1/1000 seconds to 1 second which is used for conventional cameras, but also exposure shorter than 1/1000 seconds, for example, $1/10^4$–$1/10^6$ seconds in case of the xenon flash light or the cathode ray tube, and exposure longer than 1 second can be used. If necessary, the spectral composition of light used for exposure can be controlled by a color filter.

Photographic processings of the light-sensitive materials of the present invention can be carried out by any known methods. Known processing solutions can be used. The processing temperature is generally selected from a range of 18° C. to 50° C., but a temperature lower than 18° C. or a temperature higher than 50° C. may be used, too. Any of a development processing for forming silver images (black-and-white photographic processing) and a color photographic processing comprising a development processing for forming dye images can be adopted as occasion demands.

The developing solution used in case of black-and-white photographic processing may contain known developing agents. Examples of developing agents include dihydroxybenzenes (for example, hydroquinone), 3-pyrazolidones (for example, 1-phenyl-3-pyrazolidone), aminophenols (for example, N-methyl-p-aminophenol), 1-phenyl-3-pyrazolines, ascorbic acid, and heterocyclic compounds such as those wherein a 1,2,3,4-tetrahydroquinone ring and an indoline ring are condensed as described in U.S. Pat. No. 4,067,872, which can be used alone or as a combination of them. The developing solution generally contain known preservatives, alkali agents, pH buffer agents and antifogging agents, etc. If necessary, it may contain dissolving assistants, toning agents, development accelerators, surface active agents, defoaming agents, water softeners, hardening agents and viscosity increasing agents, etc.

In one special type of development processing, the developing agent may be contained in the light-sensitive material, for example, in an emulsion layer, and the light-sensitive material is developed by processing in an aqueous alkali solution. Among the developing agents, hydrophobic agents can be incorporated in the emulsion layer as a latex dispersion as disclosed in Research Disclosure, No. 169 as RD-16928. Such a development processing may be combined with a silver salt stabilization processing using thiocyanates.

Conventional fixing solutions can be used.

Examples of useful fixing agents include thiosulfates, thiocyanates, and known organic sulfur compounds having an effect as a fixing agent.

The fixing solution may contain water soluble aluminium salts as a hardening agent.

When forming color images, known processes can be utilized.

It is possible to use a negative-positive process (for example, described in "Journal of the Society of Motion Picture and Television Engineers", Vol. 61 (1953) pages 667–701) and a color reversal process for forming color positive images which comprises forming negative silver images by developing with a developer containing a black-and-white developing agent, subjecting to at least one uniform exposure to light or another suitable fogging treatment, and subsequently carrying out color development, etc.

The color developing solution generally comprises an aqueous alkaline solution containing a color developing agent. As the color developing agent, it is possible to use known primary aromatic amine developing agents, for example, phenylenediamines (for example, 4-amino-N,N-diethylaniline, 3-methyl-4-amino-N,N-diethylaniline, 4-amino-N-ethyl-N-β-hydroxyethylaniline, 3-methyl-4-amino-N-ethyl-N-β-hydroxyethylaniline, 3-methyl-4-amino-N-ethyl-N-β-methanesulfonamidoethylaniline and 4-amino-3-methyl-N-ethyl-N-β-methoxyethylaniline, etc.).

In addition, it is possible to use substances described in L. F. A. Mason, Photographic Processing Chemistry (issued by Focal Press, 1966) pages 226–229, U.S. Pat. Nos. 2,193,015 and 2,592,364 and Japanese Patent Application No. (OPI) 64933/73, etc.

The color developing solution may contain pH buffer agents such as sulfites, carbonates, borates and phosphates of alkali metals, and development restrainers or antifogging agents such as bromides, iodides or organic antifoggants, etc. Further, it may contain, if desired, water softeners, preservatives such as hydroxylamine, organic solvents such as benzyl alcohol or diethylene glycol, development accelerators such as polyethylene glycol, quaternary ammonium salts or amines, dye forming couplers, competing couplers, fogging agents such as sodium borohydride, auxiliary developing agents such as 1-phenyl-3-pyrazolidone, viscosity imparting agents, polycarboxylic acid type chelating agents described in U.S. Pat. No. 4,083,723 and antioxidants described in German Patent Application No. (OLS) 2,622,950, etc.

The photographic emulsion layers after color development are generally subjected to bleaching processing. The bleaching processing may be carried out simultaneously with fixation processing or may be carried out respectively. As bleaching agents, compounds of polyvalence metals such as iron (III), cobalt (III), chromium (VI) or copper (II), peracids, quinones and nitroso compounds, etc. are used. For example, it is possible to use ferricyanides, bichromates, organic complex salts of iron (III) or cobalt (III), for example, complex salts of aminopolycarboxylic acids such as ethylenediaminetetraacetic acid, nitrilotriacetic acid or 1,3-diamino-2-propanol tetraacetic acid, etc. and organic acids such as citric acid, tartaric acid or malic, acid, etc.; persulfates, permanganates; and nitrosophenols, etc. Among them, potassium derricyanide, sodium ethylenediaminetetraacetato iron (III) complex and ammonium ethylenediaminetetraacetato iron (III complex are particularly useful. Ethylenediaminetetraacetato iron (III) complexes are useful for both of the bleaching solution and the mono bath bleach-fixing solution.

EXAMPLE 1

In the following, the present invention is illustrated in greater detail with reference to examples.

In order to compare the polymer latexes (A) and (B) prepared in Syntheses 9 and 10 with monomers (8) and (5) and a monomer of ultraviolet ray absorbing agent having the following structure (27), emulsified dispersions (C), (D) and (E) of the monomers (8), (5) and (27), respectively, were prepared as follows.

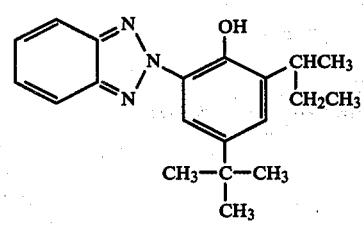
(27)

First, two kinds of solution of (a) and (b) were prepared as follows.

(a) 1000 g of a 10 weight % aqueous solution of bone gelatine (pH: 5.6 at 35° C.) was heated to 40° C. to dissolve.

(b) 27.4 g of the above described monomer (8) was dissolved in a mixed solvent composed of 40 g of dibutyl phthalate and 135 g of ethyl acetate as an auxiliary solvent at 38° C., and 23 g of a 72 weight % solution of sodium dodecylbenzenesulfonate in methanol was added to the resulting solution.

Then, the solutions (a) and (b) were put in an explosion preventive mixer. After being stirred for 1 minute at a high rate, the operation of the mixer was stopped and ethyl acetate was distilled off under a reduced pressure. Thus, an emulsified dispersion (C) of the monomer (8) was prepared.

An emulsified dispersion (D) and an emulsified dispersion (E) were prepared with using 28.7 g of the monomer (5) and 46.4 g of the monomer (27), respectively, by the same procedure as in the emulsified dispersion (C).

When carrying out emulsification of the monomers (5), (8) and (27), if dibutyl phthalate was not used, coarse crystals were separated within a very short time after emulsification, by which not only the ultraviolet ray absorbing property varied but also the coating property remarkably deteriorated.

Figure 1A:
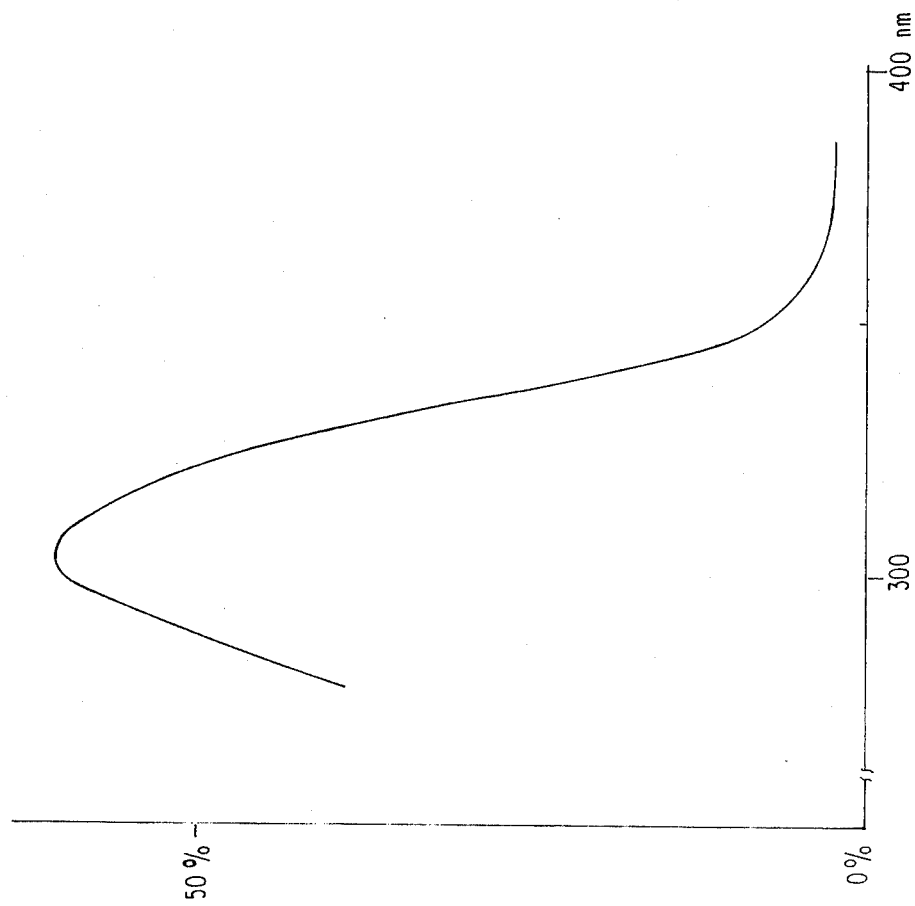
Figure 2A:
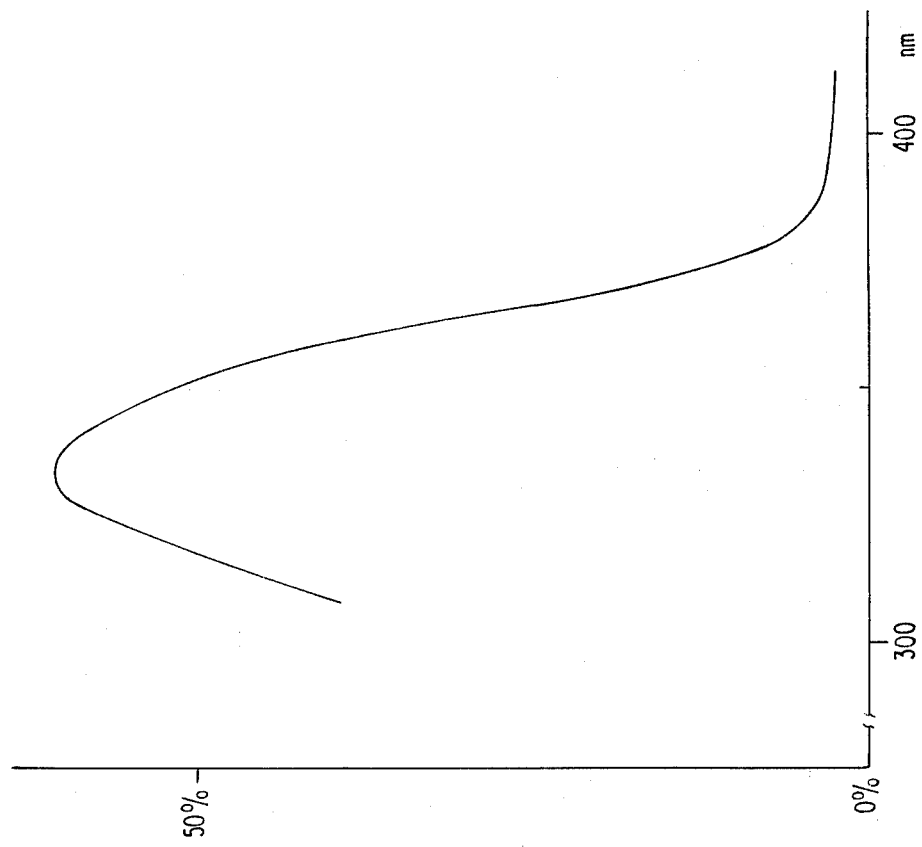
Figure 1E:
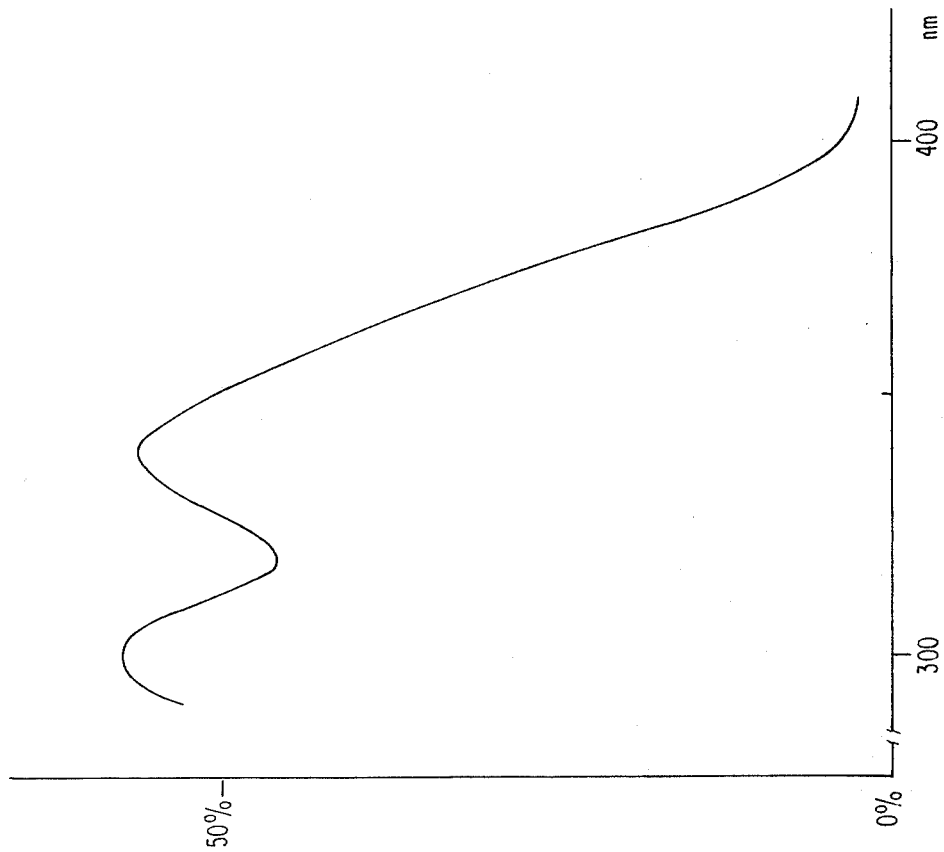

Spectral absorption characteristics of samples which were prepared by applying the above described emulsified dispersions to triacetyl cellulose bases in an amount of 4.3 g/m$^2$, respectively, were measured by means of a Hitachi 323 type self-recording spectrometer, and results shown in FIGS. 1 (a, b, c, d and e) were obtained.

FIGS. 1 (a, b, c, d and e) clearly show that the absorption peaks of (A) and (B) are kept at surprising sharpness as compared with (C), (D) and (E), in spite of polymer latexes.

The results shown in FIG. 1 are surprising matters, because it has been believed generally that the spectral absorption peak of polymers obtained by polymerization of monomers is broader than that of the monomers and such polymers can not be practically used as a photographic ultraviolet ray absorbing agent.

EXAMPLE 2

A multilayer color light-sensitive material comprising layers having the following compositions on a cellulose triacetate film base was produced.

The 1st layer: Antihalation layer (AHL)
A gelatine layer containing black colloidal silver.

The 2nd layer: Intermediate layer (ML)
A gelatine layer containing an emulsified dispersion of 2,5-di-t-octylhydroquinone.

The 3rd layer: The first red-sensitive emulsion layer (RL$_1$)
Silver iodobromide emulsion (silver iodide: 5% by mol) . . . Amount of silver coated: 1.79 g/m$^2$

| | |
|---|---|
| Sensitizing dye I | 6 × 10$^{-5}$ mols per mol of silver |
| Sensitizing dye II | 1.5 × 10$^{-5}$ mols per mol of silver |
| Coupler A | 0.04 mols per mol of silver |
| Coupler C-1 | 0.0015 mols per mol of silver |
| Coupler C-2 | 0.0015 mols per mol of silver |
| Coupler D | 0.0006 mols per mol of silver |

The 4th layer: The second red-sensitive emulsion layer (RL$_2$)
Silver iodobromide emulsion (silver iodide: 4% by mol) . . . Amount of silver coated: 1.4 g/m$^2$

| | |
|---|---|
| Sensitizing dye I | 3 × 10$^{-5}$ mols per mol of silver |
| Sensitizing dye II | 1.2 × 10$^{-5}$ mols per mol of silver |
| Coupler A | 0.02 mols per mol of silver |
| Coupler C-1 | 0.0008 mols per mol of silver |
| Coupler C-2 | 0.0008 mols per mol of silver |

The 5th layer: Intermediate layer (ML)
The same as the 2nd layer.

The 6th layer: The first green-sensitive emulsion layer (GL$_1$)
Silver iodobromide emulsion (silver iodide: 4% by mol) . . . Amount of silver coated: 1.5 g/m$^2$

| | |
|---|---|
| Sensitizing dye III | 3 × 10$^{-5}$ mols per mol of silver |
| Sensitizing dye IV | 1 × 10$^{-5}$ mols per mol of silver |
| Coupler B | 0.05 mols per mol of silver |
| Coupler M-1 | 0.008 mols per mol of silver |
| Coupler D | 0.0015 mols per mol of silver |

The 7th layer: The second green-sensitive emulsion layer (GL$_2$)
Silver iodobromide emulsion (silver iodide: 5% by mol) . . . Amount of silver coated: 1.6 g/m$^2$

| | |
|---|---|
| Sensitizing dye III | 2.5 × 10$^{-5}$ mols per mol of silver |
| Sensitizing dye IV | 0.8 × 10$^{-5}$ mols per mol of silver |

-continued

| Coupler B | 0.02 mols per mol of silver |
| Coupler M-1 | 0.003 mols per mol of silver |
| Coupler D | 0.0003 mols per mol of silver |

The 8th layer: Yellow filter layer (YFL)

A gelatine layer containing emulsified dispersion of yellow colloidal silver and 2,5-di-t-octylhydroquinone in an aqueous solution of gelatine.

The 9th layer: The first blue-sensitive emulsion layer (BL$_1$)

Silver iodobromide emulsion (silver iodide: 6% by mol) ... Amount of silver coated: 1.5 g/m$^2$

| Coupler Y-1 | 0.25 mols per mol of silver |
| The above described Compound (8) | 0.005 mols per mol of silver |

The compound (8) was added as an emulsified dispersion together with Coupler Y-1.

The 10th layer: The second blue-sensitive emulsion layer (BL$_2$)

| Silver iodobromide (silver iodide: 6% by mol) | Amount of silver coated: 1.1 g/m$^2$ |
| Coupler Y-1 | 0.06 mols per mol of silver |

The 11th layer: Protective layer (PL)

Application of a gelatine layer containing polymethyl methacrylate particles (particle size: about 1.5µ)

In addition to the above described compositions, gelatine hardeners and surface active agents were added to each layer.

Compounds used for producing samples:

Sensitizing dye I: Anhydro-5,5'-dichloro-3,3'-di-(γ-sulfopropyl)-9-ethyl-thiacarbocyanine hydroxide pyridinium salt.

Sensitizing dye II: Anhydro-9-ethyl-3,3'-di-(γ-sulfopropyl)-4,5,4',5'-dibenzothiacarbocyanine hydroxide triethylamine salt.

Sensitizing dye III: Anhydro-9-ethyl-5,5'-dichloro-3,3'-di-(γ-sulfopropyl)oxacarbocyanine sodium salt.

Sensitizing dye VI: Anhydro-5,6,5',6'-tetrachloro-1,1'-diethyl-3,3'-di-{β-[β-(γ-sulfopropoxy)ethoxy]ethyl}-imidazolocarbocyanine hydroxide sodium salt.

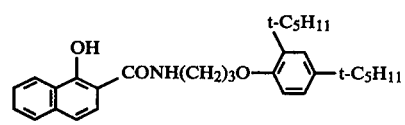
Coupler A

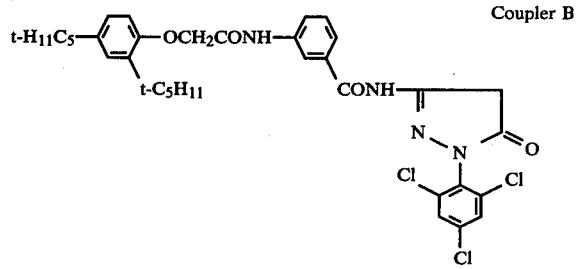
Coupler B

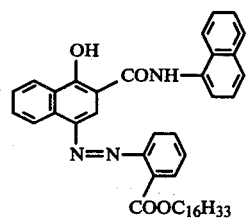
Coupler C-1

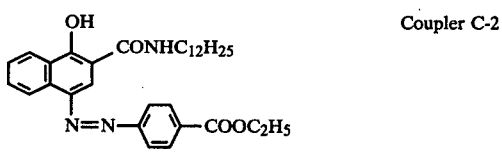
Coupler C-2

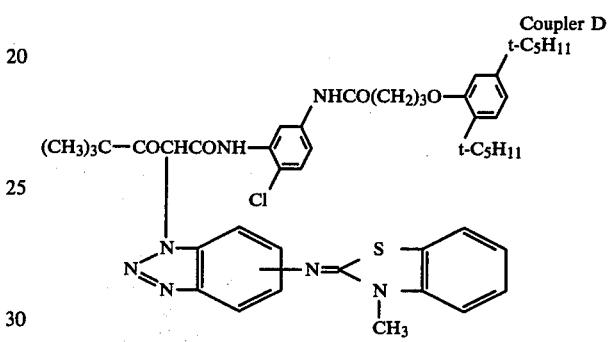
Coupler D

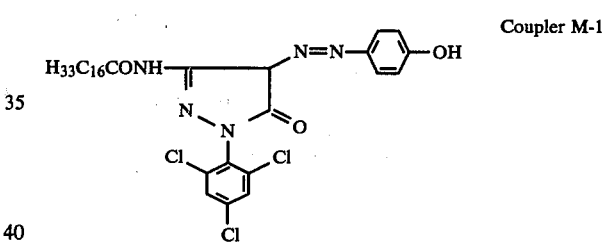
Coupler M-1

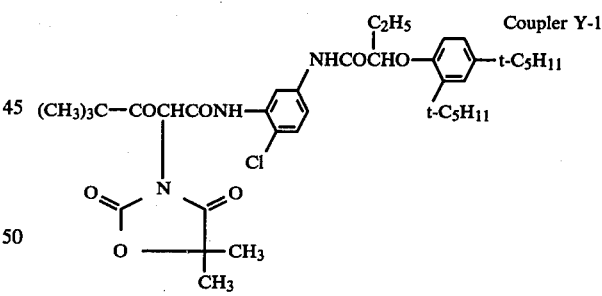
Coupler Y-1

The above described sample was named Sample I. To the protective layer of the Sample I, emulsified dispersions (A), (B), (C), (D) and (E) used in Example 1 were added in a coating amount of 4.3 g/m$^2$, respectively, to produce Samples II, III, IV, V and VI.

Using these samples, a film property, an antiadhesive property and image sharpness were measured by the following methods, and results shown in Table 2 were obtained.

(a) Film property

After a strip of the sample was immersed in a color developing solution for processing CN-16 (produced by Fuji Photo Film Co.) at 25° C. for 5 minutes, it was scratched by means of a scratch strength tester equipped with a sapphire pin having a diameter of 0.1 mm to which a weight of 0 to 200 g was continuously applied, and film strength was examined by measuring the weight by which a scratch began to be made.

(b) Antiadhesion test

A sample was cut in a size of 35 square mm. After the strips were conditioned for 1 day under a condition of 25° C. and 90% RH in such a state that each of them did not contact one another, they were preserved in such a state that the emulsion face was in contact with the back face under a condition of 40° C. and 90% RH for 2 days while applying a weight of 500 g. The films taken out were separated and the % area of the adhesion part was measured.

Valuations A–D are as follows.

| A | On the basis of adhesion area | 0–40% |
|---|---|---|
| B | " | 40–60% |
| C | " | 60–80% |

(c) Image sharpness

Image sharpness was determined by obtaining a response function (Modulation transfer function; which is referred to as MTF, hereinafter) and comparing MTF values in a certain frequency. Measurement of MTF was carried out according to the method described in Masao Takano and Kunio Fujimura, Hihakaikensa, vol. 6, pages 472–482, (1967). Exposure was carried out by white light, and measurements in R, G, and B layers were carried out through red, green and blue filters, respectively. Development was carried out by the following processings.

| 1. Color development | 3 minutes and 15 seconds |
|---|---|
| 2. Bleaching | 6 minutes and 30 seconds |
| 3. Water wash | 3 minutes and 15 seconds |
| 4. Fixation | 6 minutes and 30 seconds |
| 5. Water wash | 3 minutes and 15 seconds |
| 6. Stabilization | 3 minutes and 15 seconds |

Compositions of processing solutions used in each step were as follows.

| Color developing solution: | |
|---|---|
| Sodium nitrilotriacetate | 1.0 g |
| Sodium sulfite | 4.0 g |
| Sodium carbonate | 30.0 g |
| Potassium bromide | 1.4 g |
| Hydroxylamine sulfate | 2.4 g |
| 4-(N—ethyl-N—$\beta$-hydroxyethylamino)-2-methylaniline sulfate | 4.5 g |
| Water | to make 1 liter |
| Bleaching solution: | |
| Ammonium bromide | 160.0 g |
| Aqueous ammonia solution (28%) | 25.0 ml |
| Sodium ethylenediaminetetraacetato iron complex | 130.0 g |
| Glacial acetic acid | 14.0 ml |
| Water | to make 1 liter |
| Fixing solution: | |
| Sodium tetrapolyphosphate | 2.0 g |
| Sodium sulfite | 4.0 g |
| Ammonium thiosulfate (70%) | 175.0 ml |
| Sodium bisulfite | 4.6 g |
| Water | to make 1 liter |
| Stabilizing solution: | |
| Formalin | 8.0 ml |
| Water | to make 1 liter |

In Table 1, MTF values in a frequency of 20 per mm as shown. The value being larger means that reproduction of fine parts of images is more excellent, namely image sharpness is higher.

TABLE 1

| | Samples | | | | | |
|---|---|---|---|---|---|---|
| Examined Item | I (Blank) | II (This Invention) | III (This Invention) | IV (Comparison) | V (Comparison) | VI (Comparison) |
| Film strength | 180 g | 176 g | 175 g | 51 g | 48 g | 45 g |
| Antiadhesion | A | A | A | C | C | C |
| MTF value (%) | | | | | | |
| R | 75 | 74 | 73 | 71 | 70 | 69 |
| G | 83 | 81 | 80 | 78 | 77 | 76 |
| B | 90 | 87 | 85 | 82 | 81 | 80 |

The above described facts clearly show that the sensitive materials using the polymer ultraviolet ray absorbing agents of the present invention are greatly improved in film strength and antiadhesive strength as compared with monomers (5), (8) and (27), and they show excellent sharpness. Of course, since Sample I does not contain the ultraviolet ray absorbing agent, it can not be practically used because it has very inferior antistatic properties as compared with Samples II and III.

EXAMPLE 3

In Examples 1 and 2, the ultraviolet ray absorbing polymers were emulsified to produce latexes. However, it is possible to add the ultraviolet ray absorbing agent directly to the protective layer as a latex prepared as described in Synthesis 5 and 6.

Sample a was prepared by adding a compound of Synthesis 5 (referred to as compound (28)) into the same composition of the protective layer of Sample I in Example 2 and coating the resulting composition on a triacetyl cellulose base in a coating amount of compound (28) of 1.4 cc/m$^2$.

Sample b was prepared in the same manner as Sample a except that a compound of Synthesis 6 (referred to as compound (29)) was used in place of compound (28) in a coating amount of compound (29) of 1.6 cc/m$^2$.

Copolymer (31) of the following compound (30) and butyl acrylate (compound 30)/butyl acrylate=3/1, solid content: 7.32%) was prepared in the same manner as in Synthesis 5. Sample c was prepared in the same manner as Sample a except that the copolymer (31) was used in place of the compound (28) in a coating amount of copolymer (31) of 2.1 cc/m$^2$.

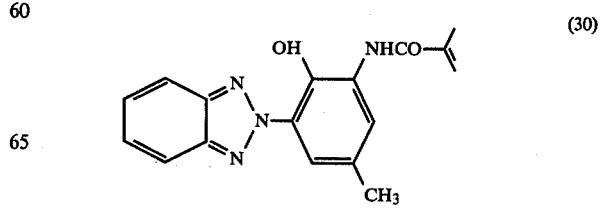

(30)

Compound (30) (monomer) was emulsified in the same manner as the emulsified dispersion (C) of Example 1 except that 29.7 g of the compound (30) (monomer) was used in place of 27.4 g of the monomer (8). The resulting emulsified dispersion was coated on a triacetyl cellulose base in a coating amount of 4.3 g/m² to produce Sample d.

Figure 2C:
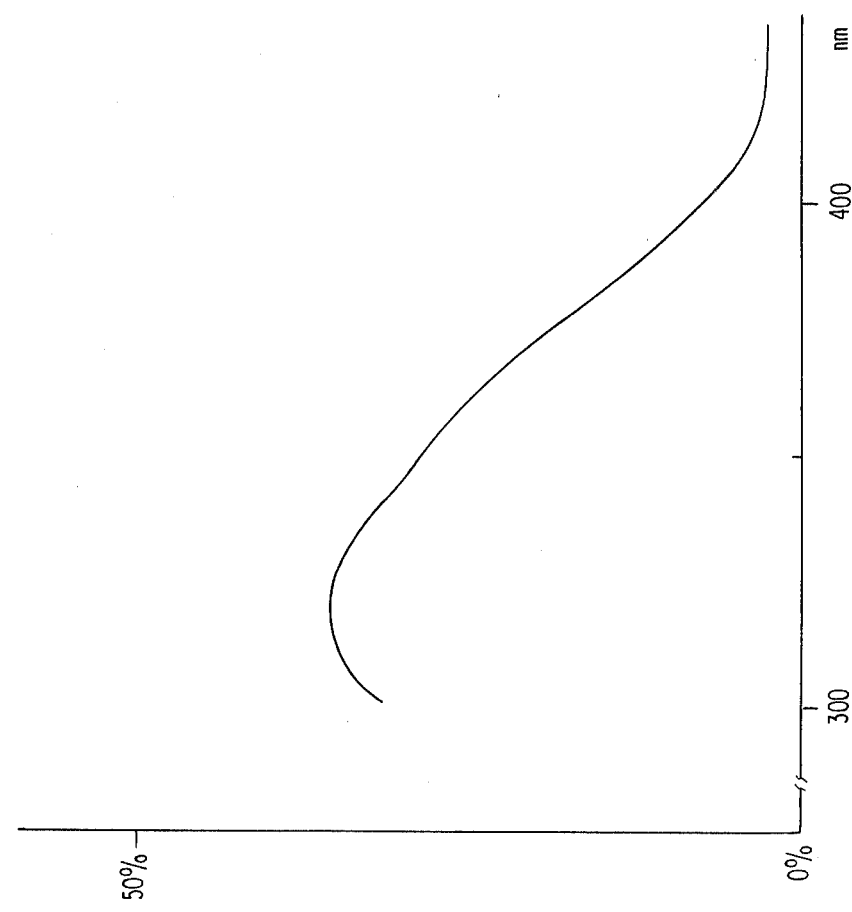
Figure 2B:
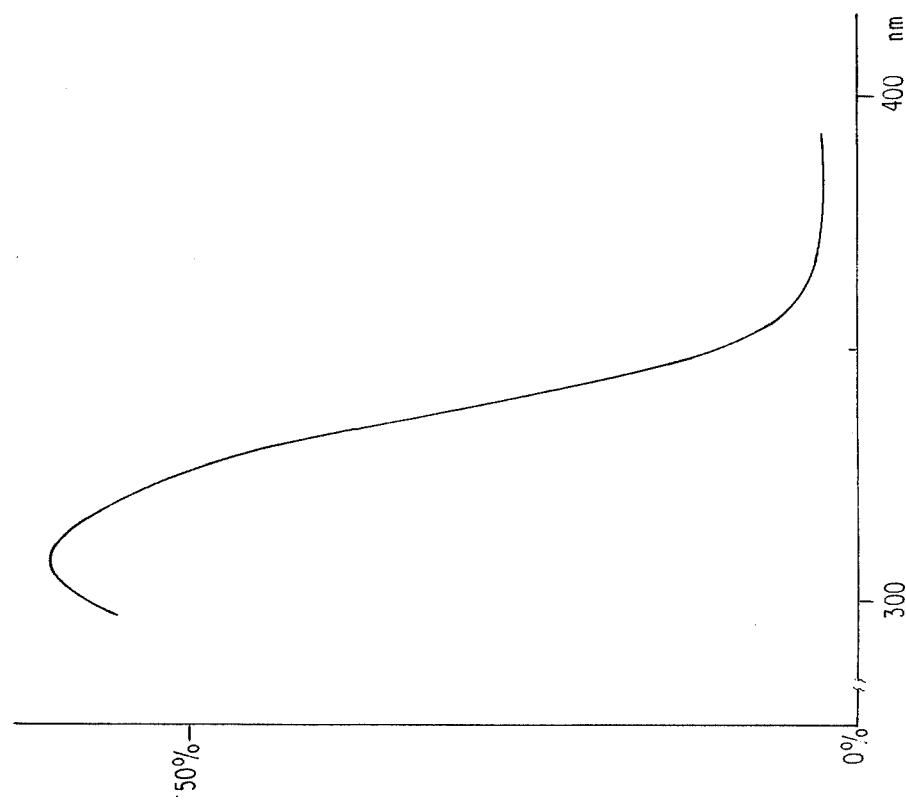
Figure 2:
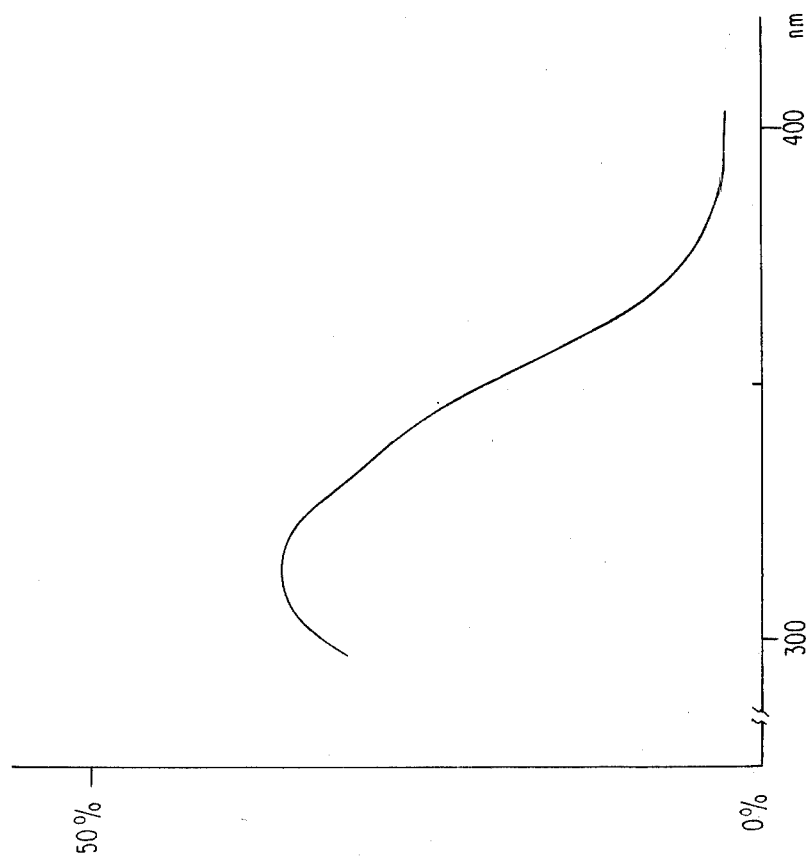

FIG. 2 indicates spectral absorption characteristics of Samples a, b, c and d.

FIG. 2 clearly shows that the Samples a and b each have a sharp absorption characteristic in spite of being the polymer. On the contrary, in Sample c, the absorbance is low and has a broad absorption extending over a visible region.

Further, the Sample I of the multicolor light-sensitive material in Example 2 and Samples VII, VIII, IX and X in which protective layers of a to d in this example were used instead of the protective layer in Sample I were compared.

Exposure was carried out using white light in which UV rays of less than about 400 nm were cut by an ultraviolet ray absorbing filter. Relative sensitivities of each blue-sensitive layer are shown in Table 2. The results clearly show that the compounds (28) and (29) do not have reduced sensitivity in the visible region similarly to compound (30), but the compound (31) remarkably reduces the sensitivity of the blue-sensitive layer in the visible region. Further, the Samples X is inferior in film strength, antiadhesion and MTF value as compared with Samples VII and VIII, which is similar to Example 2.

TABLE 2

| Examined Item | I (Blank) | VII (This Invention) | VIII (This Invention) | IX (Comparison) | X (Comparison) |
|---|---|---|---|---|---|
| Relative sensitivity of blue-sensitive layer | 100 | 100 | 100 | 74 | 100 |
| Film strength | 180 g | 178 g | 177 g | 178 g | 43 g |
| Antiadhesion | A | A | A | A | C |
| MTF value (%) | | | | | |
| R | 75 | 75 | 75 | 75 | 70 |
| G | 83 | 83 | 83 | 83 | 77 |
| B | 90 | 89 | 89 | 89 | 80 |

While the invention has been described in detail and with reference to specific embodiment thereof, it will be apparent to one skilled in the art that various changes and modifications can be made therein without departing from the spirit and scope thereof.

What is claimed is:

1. A silver halide photographic light-sensitive material comprising:
   a support base having thereon;
   a light-sensitive silver halide emulsion layer;
   a light-insensitive layer; and
   an ultraviolet ray absorbing polymer latex comprised of a homopolymer or a copolymer having repeating unit derived from monomers represented by the following general formula (I):

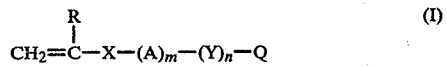

(I)

wherein R represents a hydrogen atom, a lower alkyl having 1 to 4 carbon atoms or a chlorine atom; X represents —CONH—, —COO— or a phenylene group; A represents a linking group selected from alkylene groups having 1 to 20 carbon atoms and arylene groups having 6 to 20 carbon atoms; Y represents —COO—, —OCO—, —CONH—, —NHCO—, —SO$_2$NH—, —NHSO$_2$—, —SO$_2$— or —O—; m and n each represents 0 or an integer of 1; and Q represents an ultraviolet ray absorbing group represented by the following general formula (II):

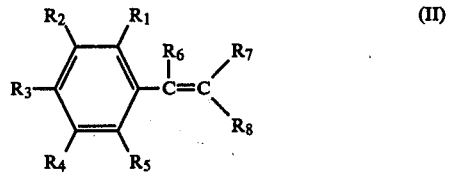

(II)

wherein $R_1$, $R_2$, $R_3$, $R_4$ and $R_5$ each represents a hydrogen atom, a halogen atom, an alkyl group having 1 to 20 carbon atoms, an aryl group having 6 to 20 carbon atoms, an alkoxy group having 1 to 20 carbon atoms, an aryloxy group having 6 to 20 carbon atoms, an alkylthio group having 1 to 20 carbon atoms, an arylthio group having 6 to 20 carbon atoms, an amino group, an alkylamino group having 1 to 20 carbon atoms, an arylamino group having 6 to 20 carbon atoms, a hydroxyl group, a cyano group, a nitro group, an acylamino group, a carbamoyl group, a sulfonyl group, a sulfamoyl group, a sulfonamide group, an acyloxy group or an oxycarbonyl group, and $R_1$ and $R_2$, $R_2$ and $R_3$, $R_3$ and $R_4$ or $R_4$ and $R_5$ may form a 5 to 6 member ring by ring closure; $R_6$ represents a hydrogen atom or an alkyl group having 1 to 20 carbon atoms; $R_7$ represents a cyano group, —COOR$_9$, —CONHR$_9$, —COR$_9$ or —SO$_2$R$_9$; and $R_8$ represents a cyano group, —COOR$_{10}$, —CONHR$_{10}$, —COR$_{10}$ or —SO$_2$R$_{10}$; wherein $R_9$ and $R_{10}$ each represents an alkyl group having 1 to 20 carbon atoms or an aryl group having 6 to 20 carbon atoms; wherein one of $R_1$, $R_2$, $R_3$, $R_4$, $R_5$, $R_6$, $R_7$ and $R_8$ bonds to the vinyl group through said linking group.

2. A silver halide photographic light-sensitive material as claimed in claim 1, wherein R represents a hydrogen atom, a lower alkyl group having 1 to 4 carbon atoms or a chlorine atom; X represents —CONH—, —COO— or a phenylene group; A represents a linking group represented by an alkylene group having 1 to 20 carbon atoms or an arylene group having 6 to 20 carbon atoms; Y represents —COO—, —OCO—, —CONH—, —NHCO— or —O—; m and n each represents 0 or an integer of 1; and Q represents an ultraviolet ray absorbing group represented by the formula (II); wherein $R_1$, $R_2$, $R_3$, $R_4$ and $R_5$ each represents a hydrogen atom, a halogen atom, an alkyl group having 1 to 20 carbon atoms, an aryl group having 6 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, a hydroxy group, an acylamino group, a carbamoyl group, an acyloxy group or an oxycarbonyl group, and $R_1$ and $R_2$, $R_2$ and $R_3$, $R_3$ and $R_4$ or $R_4$ and $R_5$ may form a 5 to 6 member ring by ring closure; $R_6$ represents a hydrogen atom, or an alkyl group having 1 to 20 carbon atom; $R_7$ represents a cyano group, —COOR$_9$, —CONHR$_9$, —COR$_9$ or —SO$_2$R$_9$; and $R_8$ represents a cyano group, —COOR$_{10}$, —CONHR$_{10}$, —COR$_{10}$ or —SO$_2$R$_{10}$; wherein $R_9$ and $R_{10}$ each represents an alkyl group having 1 to 20 carbon atoms or an aryl group having 6 to 20 carbon atoms; wherein at least one of $R_1$, $R_2$, $R_3$, $R_4$, $R_5$, $R_6$, $R_7$ and $R_8$ bonds to the vinyl group through said linking group.

3. A silver halide photographic light-sensitive material as claimed in claim 1, wherein R represents a hydrogen atom, a lower alkyl group having 1 to 4 carbon atoms or a chlorine atom; X represents —COO—; m and n represent 0; and Q represents an ultraviolet ray absorbing group represented by the general formula (II); wherein $R_1$, $R_2$, $R_4$ and $R_5$ each represents a hydrogen atom; $R_3$ represents a hydrogen atom or an alkyl group having 1 to 5 carbon atoms; $R_6$ represents a hydrogen atom; $R_7$ represents a cyano group; and $R_8$ represents —COOR$_{10}$; wherein $R_{10}$ represents an alkylene group having 1 to 20 carbon atoms which bonds to the vinyl group.

4. A silver halide photographic light-sensitive material as claimed in claim 1, wherein said ultraviolet ray absorbing polymer latex comprises a homopolymer having a repeating unit derived from the monomer represented by the general formula (I).

5. A silver halide photographic light-sensitive material as claimed in claim 1, wherein said ultraviolet ray absorbing polymer latex comprises a copolymer of the monomer represented by the general formula (I) with a comonomer selected from the group consisting of an acrylic acid, an α-chloroacrylic acid, an α-alacrylic acid, a vinyl ester, an acrylonitrile, a methacrylonitrile, an aromatic vinyl compound, an itaconic acid, a citraconic acid, a crotonic acid, a vinylidene chloride, a vinyl alkyl ether, a maleic acid ester, a N-vinyl-2-pyrrolidone, a N-vinylpyridine and 2- and 4-vinylpyridine.

6. A silver halide photographic light-sensitive material as claimed in claim 5, wherein said comonomer is an acrylic acid ester, a methacrylic acid ester or an aromatic vinyl compound.

7. A silver halide photographic light-sensitive material as claimed in claim 5, wherein said monomer is an alkyl acrylate.

8. A silver halide photographic light-sensitive material as claimed in claim 5, wherein said comonomer is a styrene.

9. A silver halide photographic light-sensitive material as claimed in claim 5, wherein said copolymer contains the monomer represented by the general formula (I) in an amount of 5% by weight or more based on the weight of the copolymer.

10. A silver halide photographic light-sensitive material as claimed in claim 9, wherein said copolymer contains the monomer represented by the general formula (I) in an amount of 50% by weight or more based on the weight of the copolymer.

11. A silver halide photographic light-sensitive material as claimed in claim 1, wherein the light-insensitive layer is a surface protective layer and further wherein the polymer latex of general formula (I) is present within said surface protective layer or a hydrophilic colloid layer adjacent to said surface protective layer.

12. A silver halide photographic light-sensitive material as claimed in claim 11, wherein the surface protective layer is comprised of 2 separate layers and further wherein the lower layer of the two surface protective layers contains the polymer latex of the general formula (I).

13. A silver halide photographic light-sensitive material as claimed in claim 1, wherein the polymer latex of the general formula (I) is present on the material in an amount within the range of 10 to 2000 mg/m$^2$ of material.

14. A silver halide photographic light-sensitive material as claimed in claim 13, wherein the polymer latex of the general formula (I) is present in an amount within the range of 50 to 1000 mg/m$^2$ of material.

* * * * *